(12) United States Patent
Kita et al.

(10) Patent No.: US 10,395,606 B2
(45) Date of Patent: Aug. 27, 2019

(54) LIQUID CRYSTAL DISPLAY DEVICE

(71) Applicant: SHARP KABUSHIKI KAISHA, Sakai, Osaka (JP)

(72) Inventors: Yuichi Kita, Sakai (JP); Takahiro Sasaki, Sakai (JP); Iori Aoyama, Sakai (JP); Kazutaka Hanaoka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/570,193

(22) PCT Filed: Apr. 18, 2016

(86) PCT No.: PCT/JP2016/062254
§ 371 (c)(1),
(2) Date: Oct. 27, 2017

(87) PCT Pub. No.: WO2016/175074
PCT Pub. Date: Nov. 3, 2016

(65) Prior Publication Data
US 2018/0144695 A1 May 24, 2018

(30) Foreign Application Priority Data
Apr. 27, 2015 (JP) ................................ 2015-090578

(51) Int. Cl.
G09G 3/36 (2006.01)
G02F 1/1343 (2006.01)
(Continued)

(52) U.S. Cl.
CPC ............ G09G 3/36 (2013.01); G02B 6/0011 (2013.01); G02F 1/1337 (2013.01);
(Continued)

(58) Field of Classification Search
CPC ............ G09G 3/36; G09G 2310/0218; G09G 2310/0235; G09G 2310/0264;
(Continued)

(56) References Cited

U.S. PATENT DOCUMENTS

2002/0196220 A1* 12/2002 Sato ....................... G09G 3/342
345/87
2004/0017342 A1 1/2004 Sekine
(Continued)

FOREIGN PATENT DOCUMENTS

JP 62-156624 A 7/1987
JP 2004-061670 A 2/2004
(Continued)

Primary Examiner — Jennifer T Nguyen
(74) Attorney, Agent, or Firm — ScienBiziP, P.C.

(57) ABSTRACT

A liquid crystal display device performs displaying by field sequential driving. The liquid crystal display device includes a plurality of scanning lines; and a plurality of signal lines including a plurality of pairs of signal lines, each pair of signal line being connected to one pixel column. Under field sequential driving, within one field period of emitting any of a plurality of color rays, there is an overlap between: a first period in which a first scanning line group included among the plurality of scanning lines are scanned and one of the pair of signal lines is used to perform signal writes; and a second period in which a second scanning line group included among the plurality of scanning lines are scanned, and another one of the pair of signal lines is used to perform signal writes.

15 Claims, 13 Drawing Sheets

(51) Int. Cl.
*G02F 1/1368* (2006.01)
*G09G 3/20* (2006.01)
*G09G 3/34* (2006.01)
*F21V 8/00* (2006.01)
*G02F 1/1337* (2006.01)
*G02F 1/1335* (2006.01)

(52) U.S. Cl.
CPC .......... *G02F 1/1343* (2013.01); *G02F 1/1368* (2013.01); *G09G 3/20* (2013.01); *G09G 3/34* (2013.01); *G09G 3/3614* (2013.01); *G09G 3/3648* (2013.01); *G02F 1/133602* (2013.01); *G02F 2001/133622* (2013.01); *G02F 2001/134381* (2013.01); *G09G 2310/0218* (2013.01); *G09G 2310/0235* (2013.01); *G09G 2310/0264* (2013.01); *G09G 2320/02* (2013.01); *G09G 2320/0252* (2013.01); *G09G 2320/0261* (2013.01)

(58) Field of Classification Search
CPC .......... G09G 2320/02; G09G 2320/025; G02F 1/139; G02F 1/133; G02F 1/0316; G02F 1/133528; G02F 1/1343; G02F 2001/13706; G02B 6/0011
USPC ...................................... 345/87–89, 94, 204
See application file for complete search history.

(56) References Cited

U.S. PATENT DOCUMENTS

| | | |
|---|---|---|
| 2005/0024548 A1 | 2/2005 | Choi et al. |
| 2014/0002761 A1* | 1/2014 | Heo ...................... G02F 1/1343 349/33 |
| 2016/0035292 A1* | 2/2016 | Lee ...................... G09G 3/3648 345/694 |
| 2016/0178979 A1 | 6/2016 | Kita et al. |

FOREIGN PATENT DOCUMENTS

| | | |
|---|---|---|
| JP | 2004-206003 A | 7/2004 |
| JP | 2006-523850 A | 10/2006 |
| JP | 2013-205502 A | 10/2013 |
| WO | 2014/136586 A1 | 9/2014 |

* cited by examiner

FIG.12
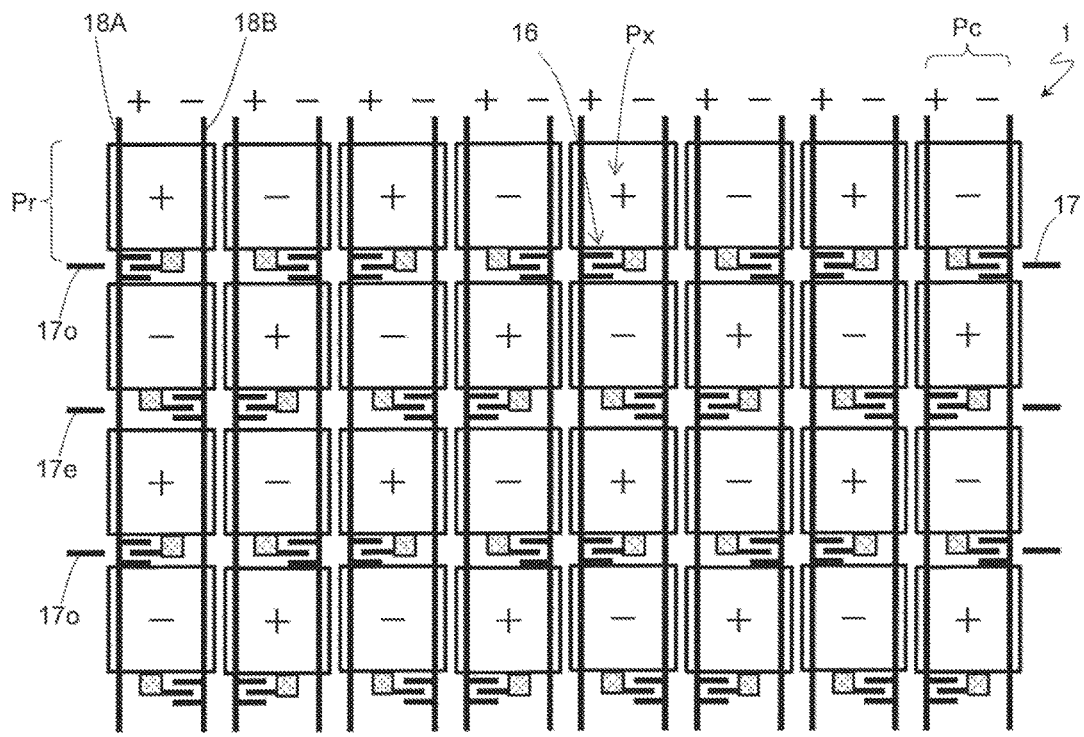
FIG.13
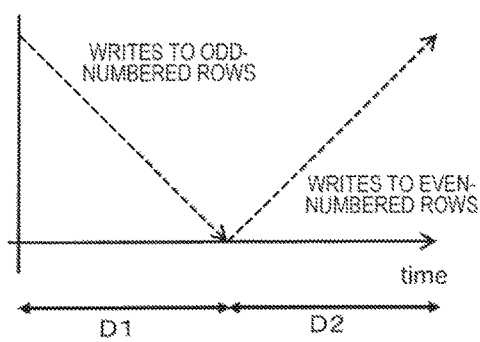
(a)
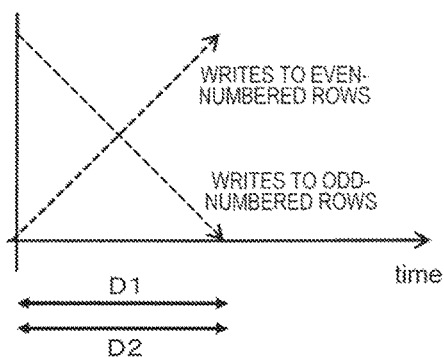
(b)
--Prior Art--

FIG.23
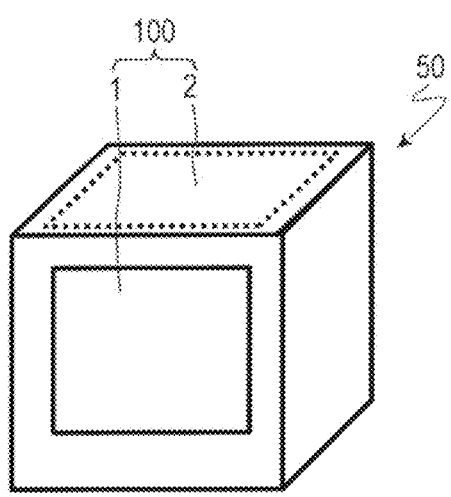
(a)
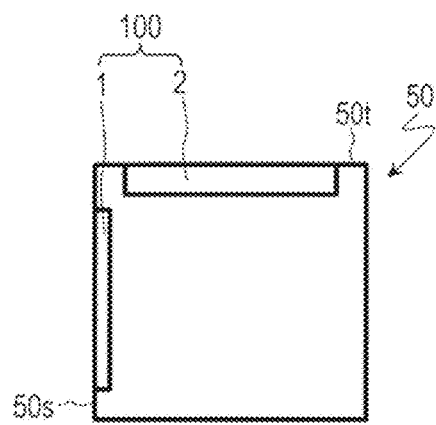
(b)

LIQUID CRYSTAL DISPLAY DEVICE

TECHNICAL FIELD

The present invention relates to a liquid crystal display device, and more particularly to a liquid crystal display device which is suitable for use as a see-through display, the liquid crystal display device being driven by the field sequential method.

BACKGROUND ART

In recent years, see-through displays have been attracting attention as the display devices for information display systems or digital signage. In a see-through display, the background (i.e., the rear-face side of the display panel) is visible in a see-through manner, thereby conducting displaying such that information which is displayed by the display panel is overlaid on the background. Thus, a see-through display has good appeal and eyecatchingness. Application of see-through displays to showcases and show windows has also been proposed.

In the case where a liquid crystal display device is used for a see-through display, its low efficiency of light utilization will be a detriment. The reasons for the low efficiency of light utilization of a liquid crystal display device are the color filters and polarizing plates, which are provided in generic liquid crystal display devices. The color filters and polarizing plates absorb light in specific wavelength regions or light of specific polarization directions.

This has led to the idea of using a liquid crystal display device of the field sequential method. Under the field sequential method, multicolor displaying is performed through time-division switching between colors of light with which a liquid crystal display panel is irradiated from an illumination element. This eliminates the need for color filters, thus improving the efficiency of light utilization.

However, since displaying in the respective colors is sequentially performed, displaying one multicolor image requires multiple times of displaying with different color rays (e.g., three times for red light displaying, green light displaying, and blue light displaying). In other words, as compared to a display device which utilizes color filters, operation at a higher driving frequency is required in order to achieve a similar frame rate of displaying. For this reason, in a liquid crystal display device driven by the field sequential method, the liquid crystal display panel is often required to have a rapid response.

Patent Document 1 discloses a liquid crystal display device having improved response characteristics because of an electrode structure being provided which is capable of switchably generating a vertical field or a lateral field across the liquid crystal layer. In the liquid crystal display device disclosed in Patent Document 1, a vertical field is generated across the liquid crystal layer in either one of the transition (rise) from a black displaying state to a white displaying state and the transition (fall) from a white displaying state to a black displaying state, while a lateral field (fringing field) is generated across the liquid crystal layer in the other. Therefore, the torque due to voltage application acts on the liquid crystal molecules in both of a rise and a fall, whereby good response characteristics are attained.

However, when the liquid crystal display device disclosed in Patent Document 1 is used for a see-through display, the problem of background blur (it being perceived as double images) may occur and a deteriorated display quality may result, as has been confirmed by the inventors. For suitability in a see-through display, as is described in Patent Document 2 by the Applicants, for example, it is preferable to achieve a transparent displaying state (see-through displaying) in the absence of any voltage applied across the liquid crystal layer, in a liquid crystal display device which is adapted to be able to generate a vertical field and a lateral field across the liquid crystal layer.

CITATION LIST

Patent Literature

[Patent Document 1] Japanese National Phase PCT Laid-Open Publication No. 2006-523850
[Patent Document 2] International Publication No. 2014/136586
[Patent Document 3] Japanese Laid-Open Patent Publication No. 2004-206003

SUMMARY OF INVENTION

Technical Problem

In a liquid crystal display device which is driven by the field sequential method, merely adopting a construction to generate a vertical field and a lateral field across the liquid crystal layer may not provide a sufficient response speed when the driving frequency is high. Under an insufficient response speed, even if a single color of red is to be displayed (i.e., blue light and green light are not meant to go out from the liquid crystal display panel), for example, other color rays which are to go out immediately after the red light may unintendedly exit, thus resulting in intermixing of colors. Also, under an insufficient response speed, the displaying state for the immediately previous color ray may affect the displaying so that, before the liquid crystal molecules attain the desired alignment, displaying occurs at a luminance which is lower or higher than expected.

Such problems of intermixing of colors and luminance fluctuation may occur in some places, but not in other places, on the panel plane of the liquid crystal display panel. This is because, during one frame period, the timing of pixel driving differs from place to place in the liquid crystal display panel. In a liquid crystal display panel, pixels in a matrix array are driven with scanning lines and signal lines; in a generic liquid crystal display device, the scanning lines may be subjected to sequential scanning from the panel upper end toward the lower end. In this case, pixels at the panel upper end and pixels at the panel lower end are subject to different driving (signal write) timings, such that the pixels at the panel lower end will be driven after the timing of driving pixels at the panel upper end.

In this context, under the field sequential method, desired displaying is easier to achieve for pixels with the earlier timing of driving (i.e., pixels which are granted a sufficient response time before emission of the color ray), but, for pixels with the later timing of driving, response of the liquid crystal molecules will not occur in time for the color ray emission, and thus intermixing of colors and luminance fluctuation are likely to result. This has caused the problems of nonuniform luminance in the panel plane or color mottling.

Patent Document 3 discloses a technique which, in a liquid crystal display device of the field sequential method, image data writes to rows of scanning lines are performed for ever other row. In the liquid crystal display device described in Patent Document 3, in one frame period, the odd-numbered rows of pixels are sequentially scanned first, an then the remaining even-numbered rows of pixels are scanned in the opposite direction. This can suppress display unevenness.

However, even when the technique described in Patent Document 3 is applied, under high-frequency driving by the field sequential method, unevenness in luminance and intermixing of colors may still occur.

The present invention has been made in order to solve the above problems, and an objective thereof is to provide a liquid crystal display device driven by the field sequential method which has improved display quality.

Solution to Problem

A liquid crystal display device according to an embodiment of the present invention is a liquid crystal display device comprising a liquid crystal display panel having a plurality of pixels thereon and an illumination element capable of switchably irradiating the liquid crystal display panel with a plurality of color rays, the liquid crystal display device performing displaying by field sequential driving, wherein, in the liquid crystal display panel, the plurality of pixels are provided in a matrix shape of rows and columns, the plurality of pixels including a plurality of pixel rows and a plurality of pixel columns, the liquid crystal display panel including a plurality of scanning lines respectively connected to the plurality of pixel rows, and a plurality of signal lines each connected to one of the plurality of pixel columns, the plurality of signal lines including a plurality of pairs of signal lines, each pair of signal line being connected to one said pixel column; and under the field sequential driving, within one field period of emitting any of the plurality of color rays, there is an overlap between: a first period in which a first scanning line group included among the plurality of scanning lines are scanned and one of the pair of signal lines is used to perform signal writes; and a second period in which a second scanning line group included among the plurality of scanning lines are scanned, the second scanning line group being different from the first scanning line group, and another one of the pair of signal lines is used to perform signal writes.

In one embodiment, in the first period, the first scanning line group is scanned in a first direction, and in the second period, the second scanning line group is scanned in a second direction which is the opposite direction of the first direction.

In one embodiment, a timing of beginning scanning in the first period in which the first scanning line group is scanned and a timing of beginning scanning in the second period in which the second scanning line group is scanned are essentially the same.

In one embodiment, the first period and the second period are essentially a same period.

In one embodiment, in a middle region along a column direction of the liquid crystal display panel, signals are written with essentially a same timing to pixel rows connected to scanning lines that are included in the first scanning line group and to pixel rows connected to scanning lines that are included in the second scanning line group.

In one embodiment, pixels connected to one of the pair of signal lines and pixels connected to the other of the pair of signal lines alternate along the pixel column.

In one embodiment, within the field period, emission of the color ray occurs after the lapse of the first period and after the lapse of the second period, with a predetermined period therefrom.

In one embodiment, emission of the color ray is performed based on a timing of making signal writes to pixel rows in a middle region along a column direction of the liquid crystal display panel, thereby enhancing displaying characteristics of the pixel rows in the middle region along the column direction over displaying characteristics of pixel rows in any other region.

In one embodiment, the first period is a period in which signal writes are selectively performed for pixel rows of either one of odd-numbered rows or even-numbered rows from an upper end toward a lower end of the liquid crystal display panel, and the second period is a period in which signal writes are selectively performed for pixel rows of the other one of odd-numbered rows and even-numbered rows from the lower end toward the upper end of the liquid crystal display panel.

One embodiment is capable of presenting a transparent displaying state in which a rear face side of the liquid crystal display panel is visible in a see-through manner.

In one embodiment, the liquid crystal display panel includes a liquid crystal display panel including a first substrate and a second substrate opposed to each other, and a liquid crystal layer interposed between the first substrate and the second substrate; the first substrate includes first electrodes respectively provided for the plurality of pixels, and second electrodes disposed below the first electrodes via an insulating layer, the second electrodes generating a lateral field across the liquid crystal layer in cooperation with the first electrode; the second substrate includes a third electrode opposed to the first electrodes and the second electrodes to generate a vertical field across the liquid crystal layer in cooperation with the first electrodes and the second electrodes; and each of the plurality of pixels is capable of switchably presenting a black displaying state of performing black displaying with a vertical field generated across the liquid crystal layer, a white displaying state of performing white displaying with a lateral field generated across the liquid crystal layer, or a transparent displaying state in which a rear face side of the liquid crystal display panel is visible in a see-through manner with no voltage being applied to the liquid crystal layer.

In one embodiment, in the transparent displaying state, liquid crystal molecules in the liquid crystal layer take a twist alignment.

Advantageous Effects of Invention

A liquid crystal display device according to an embodiment of the present invention performs displaying with a high efficiency of light utilization by field sequential driving, and achieves high-quality displaying with reduced display unevenness, etc.

BRIEF DESCRIPTION OF DRAWINGS

FIG. 12 A plan view showing a pixel construction according to Embodiment 1 of the present invention, showing a pixel construction having a double-source structure.

FIG. 13 (*a*) is a diagram showing a manner of pixel write according to a conventional example; and (*b*) is a diagram showing a manner of pixel write according to an embodiment of the present invention.

FIGS. 23 (*a*) and (*b*) are a perspective view and a cross-sectional view schematically showing another construction for the liquid crystal display device 100.

DESCRIPTION OF EMBODIMENTS

Hereinafter, with reference to the drawings, embodiments of the present invention will be described. Note that the present invention is not limited to the embodiments described below.

Figure 1:
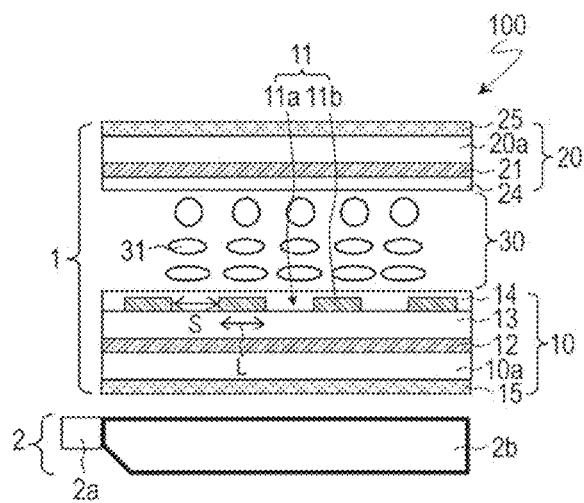
FIG. 1 A cross-sectional view schematically showing a liquid crystal display device 100 according to an embodiment of the present invention.
Figure 2:
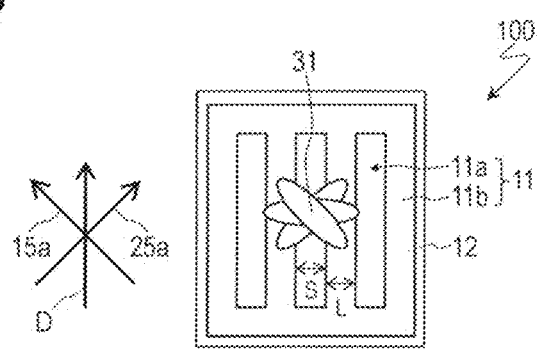
FIG. 2 A plan view schematically showing a liquid crystal display device 100 according to an embodiment of the present invention.

With reference to FIG. 1 and FIG. 2, the construction of a liquid crystal display device 100 according to the present embodiment will be described. The liquid crystal display device 100 described below is driven by the field sequential method, and is able to suitably perform displaying in a manner of allowing the background to be seen (see-through displaying). However, without being limited to the below-described liquid crystal display device 100, the liquid crystal display device according to an embodiment of the present invention permits various implementations so long as it is driven by the field sequential method.

FIG. 1 is a cross-sectional view schematically showing the liquid crystal display device 100, and FIG. 2 is a plan view schematically showing the liquid crystal display device 100.

As shown in FIG. 1, the liquid crystal display device 100 includes a liquid crystal display panel 1 and an illumination element 2. Moreover, the liquid crystal display device 100 includes a plurality of pixels arranged in a matrix array of rows and columns. The liquid crystal display device 100 performs multicolor displaying by the field sequential method.

The liquid crystal display panel 1 includes a first substrate 10 and a second substrate 20 opposing each other, and a liquid crystal layer 30 interposed between the first substrate 10 and the second substrate 20. Hereinafter, between the first substrate 10 and the second substrate 20, the first substrate 10 being positioned relatively on the rear face side will be referred to as the "rear substrate", and the second substrate 20 being positioned relatively on the front face side (the viewer's side) will be referred to as the "front substrate".

The rear substrate 10 includes a first electrode 11 provided for each of the plurality of pixels and a second electrode 12 which cooperates with the first electrode 11 to generate a lateral field across the liquid crystal layer 30. Via an insulating layer 13, the first electrode 11 is located on the second electrode 12. Stated otherwise, the second electrode 12 is located under the first electrode 11 via the insulating layer 13. Hereinafter, between the first electrode 11 and the second electrode 12, the first electrode 11 taking a relatively upper position will be referred to as the "upper electrode", and the second electrode 12 taking a relatively lower position will be referred to as the "lower electrode". The lower electrode 12, insulating layer 13, and the upper electrode 11 are supported by an insulative transparent substrate (e.g., a glass substrate or a plastic substrate) 10*a*.

As shown in FIG. 1 and FIG. 2, the upper electrode 11 has a plurality of slits 11*a* extending along a predetermined direction D and a plurality of branch portions (combteeth)

11b extending in parallel to the direction that the slits 11a extend (which hereinafter may also be referred to as the "slit direction") D. Note that the numbers of slits 11a and branch portions 11b are not limited to the examples illustrated in FIG. 1 and FIG. 2. There is no particular limitation as to the width S of each slit 11a. The width S of each slit 11a is typically not less than 2 µm and not more than 10 µm. Also, there is no particular limitation as to the width L of each branch portion 11b. The width L of each branch portion 11b is typically not less than 2 µm and not more than 10 µm. The upper electrode 11 is made of a transparent electrically conductive material (e.g., ITO).

The lower electrode 12 has no slits. That is, the lower electrode 12 is a so-called spread electrode. The lower electrode 12 is made of a transparent electrically conductive material (e.g., indium tin oxide (ITO)).

There is no particular limitation as to the material of the insulating layer 13. As the material of the insulating layer 13, for example, an inorganic material such as silicon oxide ($SiO_2$) or silicon nitride ($SiN_x$), or an organic material such as a photo-sensitive resin can be used.

The front substrate 20 includes a third electrode (hereinafter referred to as the "counter electrode") 21 which opposes the upper electrode (first electrode) 11 and the lower electrode (second electrode) 12. The counter electrode 21 is supported by an insulative transparent substrate (e.g., a glass substrate or a plastic substrate) 20a.

The counter electrode 21 generates a vertical field across the liquid crystal layer 30 in cooperation with the upper electrode 11 and the lower electrode 12. The counter electrode 21 is made of a transparent electrically conductive material (e.g., ITO).

Although not shown in FIG. 1, a dielectric layer (overcoat layer) 22 may be formed on the counter electrode 21. The overcoat layer 22 is to be provided in order to weaken a vertical field which will inevitably occur when a lateral field is generated. The overcoat layer may be made of a photo-sensitive resin, for example.

The liquid crystal layer 30 contains liquid crystal molecules 31 having positive dielectric anisotropy. In other words, the liquid crystal layer 30 is made of a positive type liquid crystal material. Note that the orientation directions of the liquid crystal molecules 31 shown in FIG. 1 and FIG. 2 are those in a state where no voltage is applied to the liquid crystal layer 30.

The liquid crystal display panel 1 further includes a pair of horizontal alignment films 14 and 24 which oppose each other via the liquid crystal layer 30. One (which hereinafter may be referred to as the "first horizontal alignment film") 14 of the pair of horizontal alignment films 14 and 24 is formed on a surface of the rear substrate 10 that faces the liquid crystal layer 30. The other (which hereinafter may be referred to as the "second horizontal alignment film") 24 of the pair of horizontal alignment films 14 and 24 is formed on a surface of the front substrate 20 that faces the liquid crystal layer 30.

The first horizontal alignment film 14 and the second horizontal alignment film 24 have each been subjected to an alignment treatment, thus possessing an alignment regulating force that causes the liquid crystal molecules 31 in the liquid crystal layer 30 to be aligned in a predetermined direction (called a "pretilt direction"). As the alignment treatment, for example, a rubbing treatment or a photo-alignment treatment is conducted.

The pretilt direction defined by each of the first horizontal alignment film 14 and the second horizontal alignment film 24 is set so that the liquid crystal molecules 31 will take a twist alignment in a state where no voltage is applied to the liquid crystal layer 30 (i.e., a state where no electric field is generated). Specifically, the pretilt direction defined by each of the first horizontal alignment film 14 and the second horizontal alignment film 24 constitutes an angle of substantially 45° with the slit direction D. Moreover, the pretilt direction that is defined by the second horizontal alignment film 24 constitutes an angle of 90° with the pretilt direction that is defined by the first horizontal alignment film 14. Therefore, in a state where no voltage is applied to the liquid crystal layer 30, the liquid crystal molecules 31 take a 90° twisted alignment.

The liquid crystal display panel 1 further includes a pair of polarizing plates 15 and 25 which oppose each other via the liquid crystal layer 30. A transmission axis (polarization axis) 15a of one (which hereinafter may be referred to as the "first polarizing plate") 15 of the pair of polarizing plates 15 and 25 is substantially orthogonal to a transmission axis (polarization axis) 25a of the other (which hereinafter may be referred to as the "second polarizing plate") 25, as shown in FIG. 2. In other words, the first polarizing plate 15 and the second polarizing plate 25 are placed in crossed Nicols. The respective transmission axes 15a and 25a of the first polarizing plate 15 and the second polarizing plate 25 are substantially parallel or substantially orthogonal to the pretilt directions which are respectively defined by the first horizontal alignment film 14 and the second horizontal alignment film 24. Therefore, the respective transmission axes 15a and 25a of the first polarizing plate 15 and the second polarizing plate 25 constitute angles of substantially 45° with respect to the slit direction D.

The illumination element (referred to as the "backlight") 2 is located on the rear face side of the liquid crystal display panel 1. The illumination element 2 is able to switchably irradiate the liquid crystal display panel 1 with a plurality of color rays including red light, green light, and blue light. The aforementioned plurality of color rays may include a color ray that emanates from light which is simultaneously radiated from light sources of different colors (e.g., white light).

As the illumination element 2, an edgelight-type backlight such as that shown in FIG. 1 can be used. The edgelight-type backlight 2 includes a light source unit 2a and a light guide plate 2b. The light source unit 2a is capable of emitting a plurality of color rays including red light, green light, and blue light. For example, the light source unit 2a includes a red LED, a green LED, and a blue LED. The light guide plate 2b guides color rays which are emitted from the light source unit 2a to the liquid crystal display panel 1.

The light guide plate 2b of the illumination element 2 is disposed so as to overlap the liquid crystal display panel 1 at the rear face of the liquid crystal display panel 1. However, since the light guide plate 2b itself is light-transmissive, the illumination element 2 is in a state of transmitting external light when the illumination element 2 is in an OFF state, i.e., when the light source unit 2a is not emitting any color rays. At this time, the viewer is able to perceive the background via the liquid crystal display panel 1 and the illumination element 2. The light guide plate 2b has a thickness of 1 mm to 10 mm, for example, and may be formed by using a light-transmitting material, e.g., glass or plastic.

The liquid crystal display device 100 is arranged so as to perform multicolor displaying by the field sequential method, and the liquid crystal display panel 1 may not include color filters. In the liquid crystal display device 100, it is also possible to drive the pixels of the liquid crystal display panel 1 while maintaining the transparent state (OFF state) of the illumination element 2, without performing any displaying by the field sequential method. In this case, see-through displaying via the liquid crystal display panel 1 can be achieved with transmittance control on a pixel-by-pixel basis, whereby visual effects may be introduced to the background, or augmented reality may be provided.

In the case where multicolor displaying is performed by the field sequential method, when a predetermined voltage is applied between the upper electrode 11 and the lower electrode 12 (i.e., a predetermined potential difference is introduced therebetween), a lateral field (fringing field) is generated across the liquid crystal layer 30. A "lateral field" is an electric field containing a component which is substantially parallel to the substrate plane. The direction of the lateral field which is generated by the upper electrode 11 and the lower electrode 12 is substantially orthogonal to the slit direction D.

On the other hand, when a predetermined voltage is applied between the counter electrode 21 and the upper electrode 11 and lower electrode 12 (i.e., a predetermined potential difference is introduced therebetween), a vertical field is generated. A "vertical field" is an electric field whose direction is substantially parallel to the substrate-plane normal direction.

The liquid crystal display device 100 is constructed so that the intensities of the lateral field and the vertical field can be controlled with respect to each pixel. Typically, the liquid crystal display device 100 is constructed so that a voltage differing from pixel to pixel can be respectively supplied for the upper electrode 11 and the lower electrode 12. Specifically, both the upper electrode 11 and the lower electrode 12 are formed in isolated pieces corresponding to pixels, such that each pixel has a switching element (e.g., a thin film transistor; not shown) electrically connected to the upper electrode 11 and a switching element (e.g., a thin film transistor; not shown) electrically connected to the lower electrode 12. A predetermined voltage is supplied to each of the upper electrode 11 and the lower electrode 12 via a corresponding switching element. Moreover, the counter electrode 21 is formed as a single continuous electrically conductive film that is common across all pixels. Therefore, a common potential is applied to the counter electrode 21 for all pixels.

Figure 3:
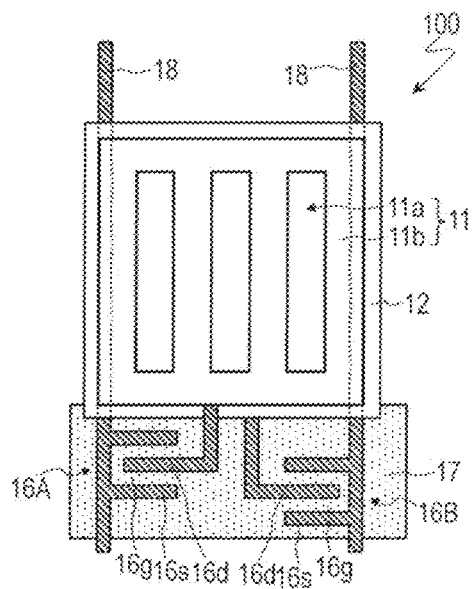
FIG. 3 A plan view showing an example of a specific wiring structure on a rear substrate 10 of the liquid crystal display device 100.

FIG. 3 shows an example of a specific wiring structure for the rear substrate 10. In the construction shown in FIG. 3, a first TFT 16A corresponding to the upper electrode 11 and a second TFT 16B corresponding to the lower electrode 12 are provided for each pixel.

The respective gate electrodes 16g of the first TFT 16A and the second TFT 16B are electrically connected to a gate bus line (scanning line) 17. Herein, the portions of the gate bus line 17 that overlap the channel regions of the first TFT 16A and the second TFT 16B function as the gate electrodes 16g. Respective source electrodes 16s of the first TFT 16A and the second TFT 16B are electrically connected to source bus lines (signal lines) 18. Moreover, portions branching out from the source bus lines 18 function as the source electrodes 16s. A drain electrode 16d of the first TFT 16A is electrically connected to the upper electrode 11. On the other hand, a drain electrode 16d of the second TFT 16B is electrically connected to the lower electrode 12. Note that the wiring structure of the rear substrate 10 is not limited to what is exemplified in FIG. 3. For example, when the double-source structure which will be described below is applied to the rear substrate 10, on one side of the pixel, the first TFT 16A being connected to the upper electrode 11 and the second TFT 16B being connected to the lower electrode 12 may be disposed close to each other, with different source bus lines being disposed in their respective proximity.

In the liquid crystal display device 100 of the present embodiment, each of the plurality of pixels is able to switchably present: a "black displaying state", where black displaying is performed with a vertical field being generated across the liquid crystal layer 30; a "white displaying state", where white displaying is performed with a lateral field being generated across the liquid crystal layer 30; or a "transparent displaying state", where the rear face side (i.e., the background) of the liquid crystal display panel 1 is visible in a see-through manner with no voltage being applied to the liquid crystal layer 30.

Figure 4:
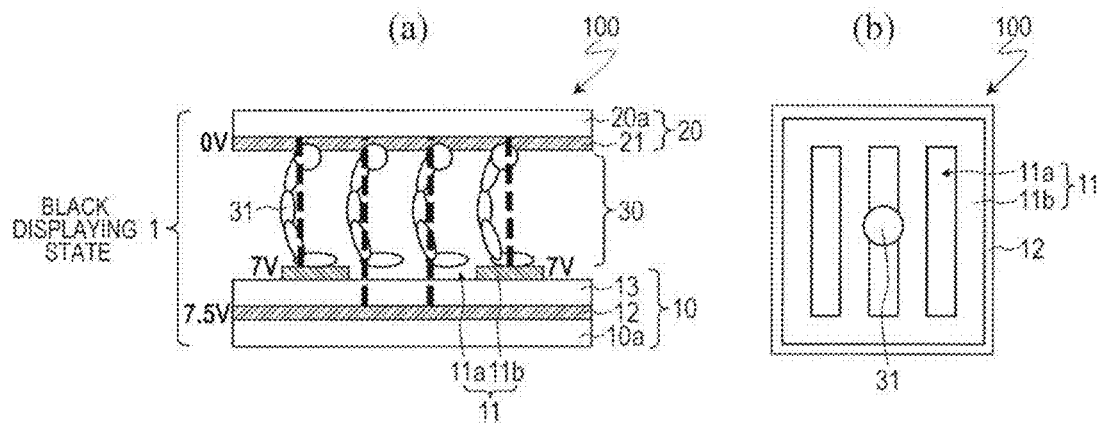
FIGS. 4 (*a*) and (*b*) are a cross-sectional view and a plan view showing an alignment of liquid crystal molecules 31 in a black displaying state of the liquid crystal display device 100.

Hereinafter, with reference to FIG. 4, FIG. 5 and FIG. 6, the black displaying state, the white displaying state, and the transparent displaying state will be described in more detail.

FIGS. 4(a) and (b) shows an alignment of liquid crystal molecules 31 in a black displaying state. In the black displaying state, a predetermined voltage is applied between the counter electrode 21 and the upper electrode 11 and lower electrode 12 (e.g., potentials of 7 V, 7.5 V, and 0 V being respectively given to the upper electrode 11, the lower electrode 12, and the counter electrode 21), whereby a vertical field is generated across the liquid crystal layer 30. FIG. 4(a) schematically shows the electric lines of force in this state with broken lines.

In this black displaying state, as shown in FIGS. 4(a) and (b), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30). Note that the liquid crystal molecules 31 in the close neighborhood of the first horizontal alignment film 14 and the second horizontal alignment film 24 are strongly affected by the alignment regulating forces of the first horizontal alignment film 14 and the second horizontal alignment film 24, and therefore remain aligned substantially parallel to the substrate plane. However, since these liquid crystal molecules 31 are substantially parallel or substantially orthogonal to the transmission axis 15a of the first polarizing plate 15, they hardly confer any phase difference to the light passing through the first polarizing plate 15 and entering the liquid crystal layer 30, and thus hardly lower the contrast ratio.

Figure 5:
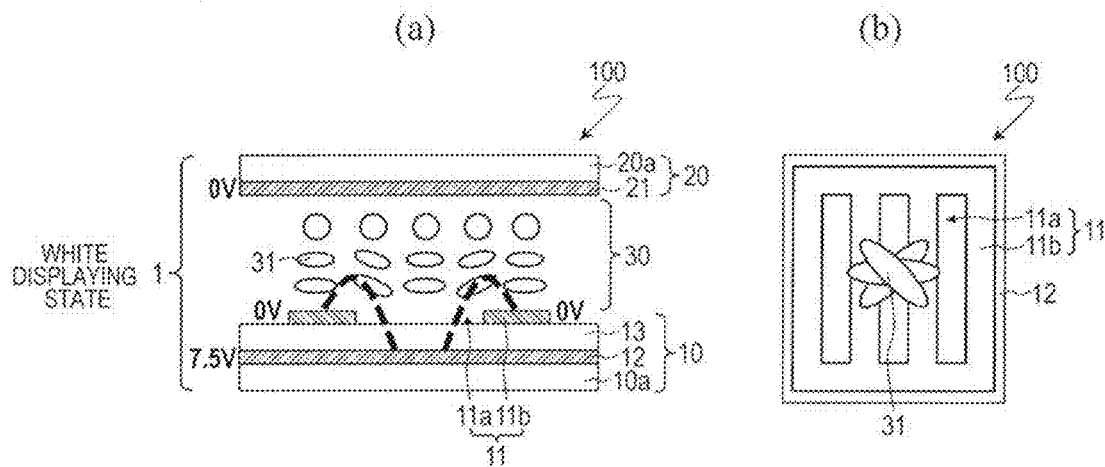
FIGS. 5 (*a*) and (*b*) are a cross-sectional view and a plan view showing an alignment of liquid crystal molecules 31 in a white displaying state of the liquid crystal display device 100.
Figure 6:
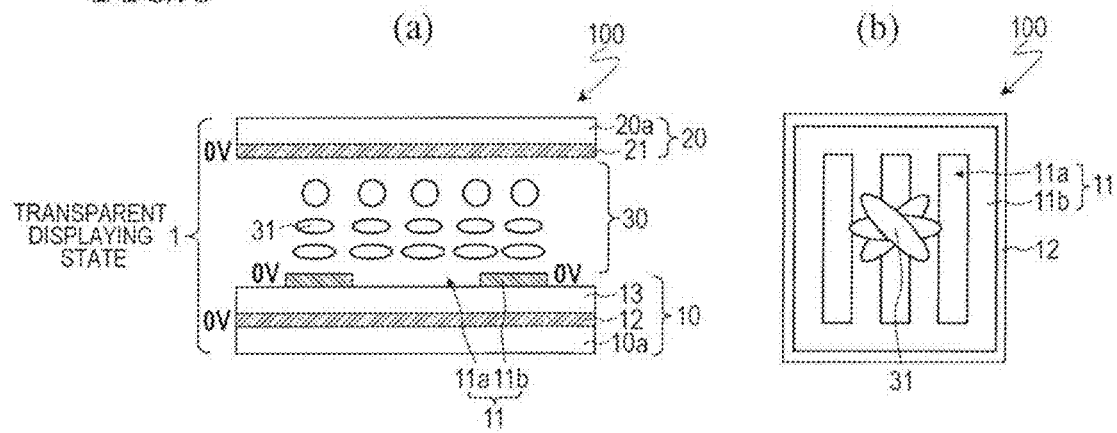
FIGS. 6 (*a*) and (*b*) are a cross-sectional view and a plan view showing an alignment of liquid crystal molecules 31 in a transparent displaying state of the liquid crystal display device 100.

FIGS. 5(a) and (b) show an alignment of liquid crystal molecules 31 in the white displaying state. In the white displaying state, a predetermined voltage is applied between the upper electrode 11 and the lower electrode 12 (e.g., potentials of 0 V, 7.5 V, and 0 V being respectively given to the upper electrode 11, the lower electrode 12, and the counter electrode 21), thereby generating a lateral field (fringing field) across the liquid crystal layer 30. FIG. 5 schematically shows the electric lines of force in this state with broken lines.

In this white displaying state, as shown in FIGS. 5(a) and (b), the liquid crystal molecules 31 in the liquid crystal layer 30 are aligned substantially in parallel to the substrate plane (i.e., substantially vertically to the layer normal direction of the liquid crystal layer 30). More specifically, the liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the direction (slit direction) D that the slits 11a of the upper electrode 11 extend.

Therefore, an average orientation direction of the bulk liquid crystal is substantially orthogonal to the slit direction D. It constitutes an angle of substantially 45° with respect to the respective transmission axes 15a and 25a of the first polarizing plate 15 and the second polarizing plate 25.

FIGS. 6(a) and (b) show an alignment of liquid crystal molecules 31 in the transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, the liquid crystal molecules 31 in the liquid crystal layer 30 take a twist alignment, as shown in FIGS. 6(a) and (b). In other words, the liquid crystal molecules 31 are aligned substantially in parallel to the substrate plane (i.e., substantially vertically to the layer normal direction of the liquid crystal layer 30). The liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the slit direction D. Therefore, an average orientation direction of the liquid crystal molecules 31 in the bulk liquid crystal are substantially orthogonal to the slit direction D (i.e., constituting an angle of substantially 45° with respect to the respective transmission axes 15a and 25a of the first polarizing plate 15 and the second polarizing plate 25). The light transmittance of each pixel of the liquid crystal display device 100 is the highest in this transparent displaying state (i.e., higher than those in the black displaying state and the white displaying state).

Figure 7:
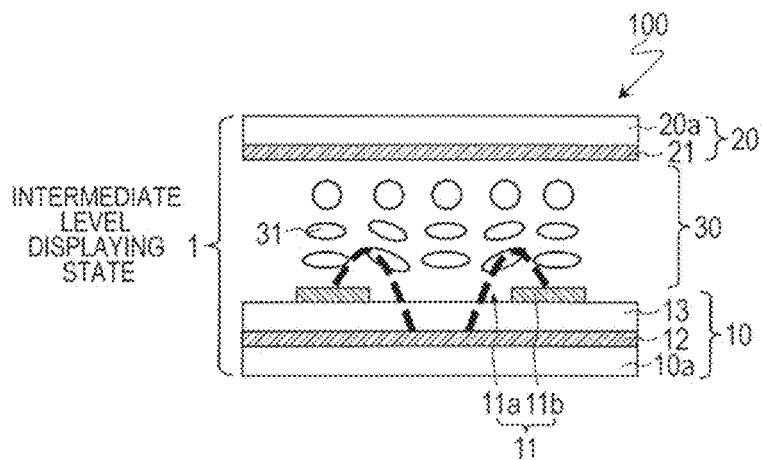
FIG. 7 A cross-sectional view showing an alignment of liquid crystal molecules 31 in an intermediate level displaying state of the liquid crystal display device 100.

In addition to the aforementioned black displaying state, white displaying state, and transparent displaying state, each of the plurality of pixels of the liquid crystal display device 100 is able to present an "intermediate level displaying state" of presenting a luminance corresponding to an intermediate gray scale level, as shown in FIG. 7. In an intermediate level displaying state, as shown in FIG. 7, desired transmittance can be realized by adjusting the intensity of a lateral field (fringing field) to be generated across the liquid crystal layer 30, for example. Without being limited to a lateral field, a vertical field that is generated across the liquid crystal layer 30 may have its intensity adjusted in order to display intermediate gray scale levels. In displaying an intermediate gray scale level, both the lateral field and the vertical field may be adjusted in magnitude. However, when performing displaying by the field sequential method, at least a lateral field is preferably applied in displaying an intermediate gray scale level, in order to attain a high response speed.

In the case where the illumination element 2 is not provided on the rear face of the liquid crystal display panel 1, displaying can be conducted in such a manner that information which is displayed by the liquid crystal display panel 1 is overlaid on the background. In this case, the pixels in a portion of the displaying region where the information is to be displayed present the black displaying state, the white displaying state, or an intermediate level displaying state, while the pixels in any other portion present the transparent displaying state. Switching between these displaying states may be conducted in the following manner, for example.

A driving circuit for a generic liquid crystal display device includes an 8-bit driver IC, and generates output voltages corresponding to 256 gray scale levels ($0^{th}$ to $255^{th}$ gray scale levels). In a generic liquid crystal display device, the $0^{th}$ gray scale level is assigned to the black displaying state; the $1^{st}$ to $254^{th}$ gray scale levels are assigned to intermediate level displaying states; and the $255^{th}$ gray scale level is assigned to the white displaying state.

In the liquid crystal display device 100 of the present embodiment, for example, the $0^{th}$ gray scale level may be assigned to the black displaying state, the $1^{st}$ to $253^{rd}$ gray scale levels assigned to intermediate level displaying states, the $254^{th}$ gray scale level assigned to the white displaying state, and the $255^{th}$ gray scale level assigned to the transparent displaying state, thereby being able to switch between the black displaying state, intermediate level displaying states, the white displaying state, and the transparent displaying state. Note that it is not necessary for the transparent displaying state to be associated with the $255^{th}$ gray scale level, and any gray scale level may be assigned to the transparent displaying state. In cases other than displaying in 256 gray scale levels exemplified herein, too, a specific gray scale level may be assigned to the transparent displaying state.

Figure 8:
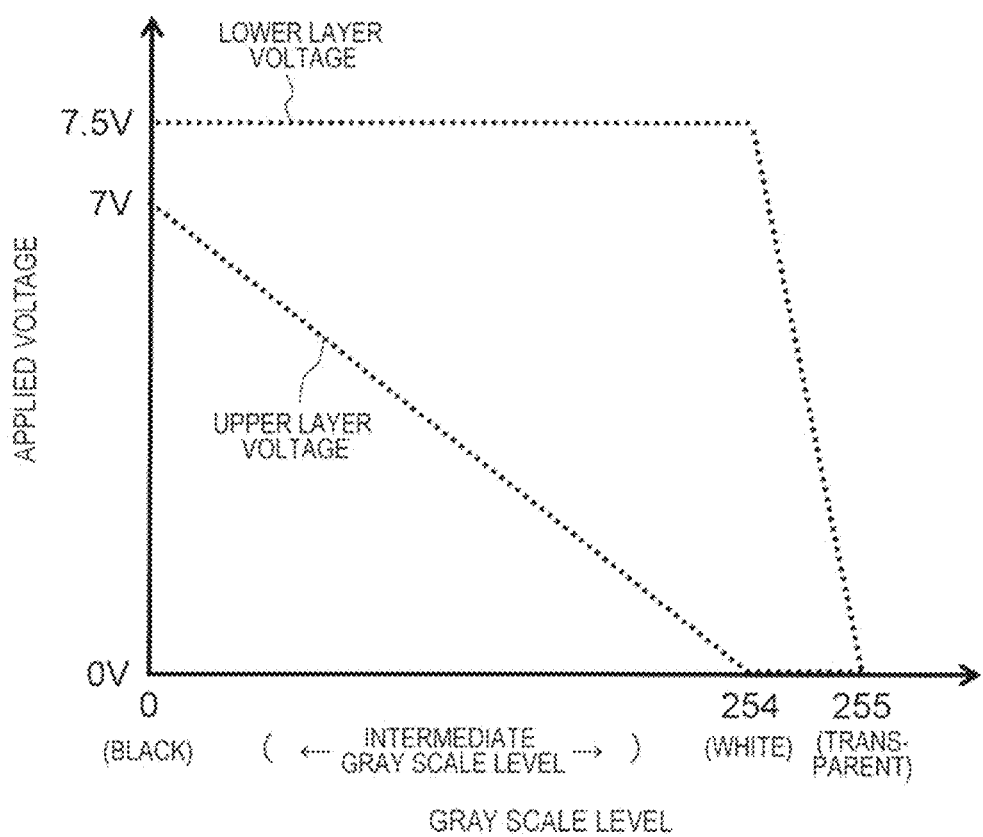
FIG. 8 A graph showing an exemplary voltage setting (a relationship between an upper layer voltage and a lower layer voltage and the gray scale level) at varying gray scale levels.

FIG. 8 is a graph showing an exemplary voltage setting (a relationship between an upper layer voltage and a lower layer voltage and the gray scale level) at varying gray scale levels. In the example shown in FIG. 8, as the gray scale level increases from the $0^{th}$ gray scale level (corresponding to the black displaying state) to the $254^{th}$ gray scale level (corresponding to the white displaying state), the upper layer voltage becomes lower while the lower layer voltage remains constant. Specifically, while the lower layer voltage remains at 7.5 V, the upper layer voltage changes (lowers) from 7 V to 0 V. In this manner, the intensity of the lateral field is changed, whereby intermediate gray scale levels are displayed. At the $255^{th}$ gray scale level (corresponding to the transparent displaying state), not only the upper layer voltage but also the lower layer voltage becomes 0 V.

Although not shown in FIG. 8, the applied voltage to the counter electrode 21 (counter voltage) is 0 V for all gray scale levels. In black displaying, hardly any lateral field is generated, and essentially only a vertical field is applied across the liquid crystal layer 30 between the upper electrode 11 and lower layer voltage 12 and the counter electrode 21. In white displaying, the greatest lateral field is applied, and also a vertical field is applied.

In the implementation shown in FIG. 8, the voltages that are applied to the upper electrode 11 and the lower layer voltage 12 during black displaying are slightly varied, i.e., 7 V and 7.5 V, for the following reason. Only the liquid crystal layer 30 exists between the upper electrode 11 and the counter electrode 21; however, between the lower electrode 12 and the counter electrode 21, not only the liquid crystal layer 30 but also the insulating layer 13 exists. In this case, by setting the lower layer voltage to be higher than the upper layer voltage, the effective voltage that is applied across the liquid crystal layer 30 can be equalized between the regions (branch portions 11b) where the upper electrode 11 is provided and the regions (slits 11a) where the upper electrode 11 is not provided. As a result, a uniform vertical field can be applied across the liquid crystal layer 30 during black displaying, and thus nonuniformity in alignment can be suppressed between the branch portions 11b and the slits 11a of the upper electrode 11.

Note that, during see-through displaying (i.e., the illumination element 2 being turned OFF), a voltage may be applied across the liquid crystal layer 30, so that the liquid crystal display device 100 of the present embodiment displays the background with a pixel-by-pixel transmittance control. In this state, no color rays are emitted from the illuminator 2 and field sequential driving is not being performed; however, under a setting such that similar voltages are applied to the lower electrode and to the upper electrode at any arbitrary gray scale level, it becomes possible to maintain a state where no lateral field is essentially applied across the liquid crystal layer 30. Thus, based on the displaying which uses essentially only a vertical field in controlling the transmittance of the liquid crystal layer 30, a refractive index distribution is restrained from occurring within the pixel, thus preventing doubling blur and improving the quality of see-through displaying.

Figure 9:
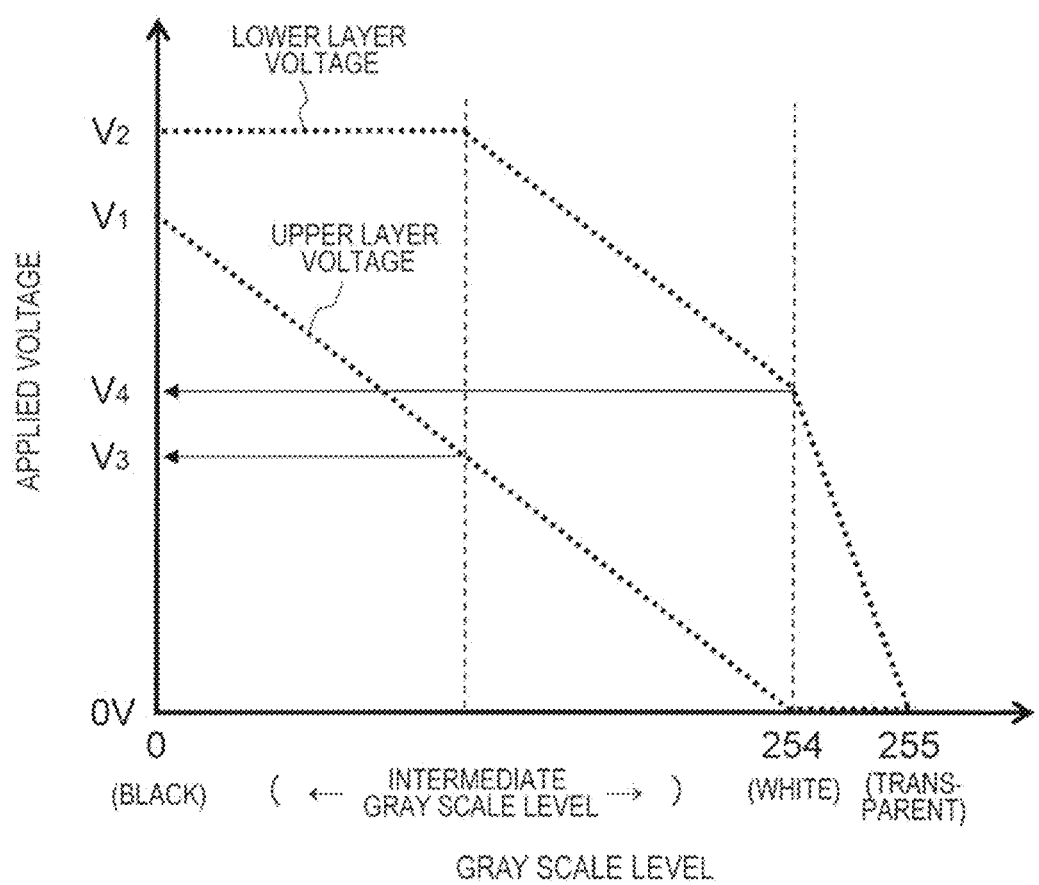
FIG. 9 A graph showing another exemplary voltage setting (a relationship between an upper layer voltage and a lower layer voltage and the gray scale level) at varying gray scale levels.

When performing field sequential driving, as shown in FIG. 9, it may be ensured that the potential difference between the upper electrode 11 and the lower electrode 12 at each gray scale level from the lowest gray scale level to the highest gray scale level is a predetermined ratio or less of the potential difference between the lower electrode 12 and the counter electrode 21 in the black displaying state. More specifically, the potential difference between the upper electrode 11 and the lower electrode 12 at each gray scale level may be a predetermined ratio or less (specifically, 60% or less) of the potential difference between the lower electrode 12 and the counter electrode 21 in the black displaying state. Through this, the possibility of abnormal changes in alignment occurring at varying gray scale levels can be reduced, thus realizing higher-quality displaying.

As described above, in the liquid crystal display device 100, response speed can be improved by controlling the liquid crystal molecule alignment with a vertical field and a lateral field. Vivid see-through displaying can also be performed.

Hereinafter, an implementation which is suitable for suppressing unevenness in luminance and intermixing of colors, as may occur during field sequential driving of the liquid crystal display device 100, will be described.

Figure 10:
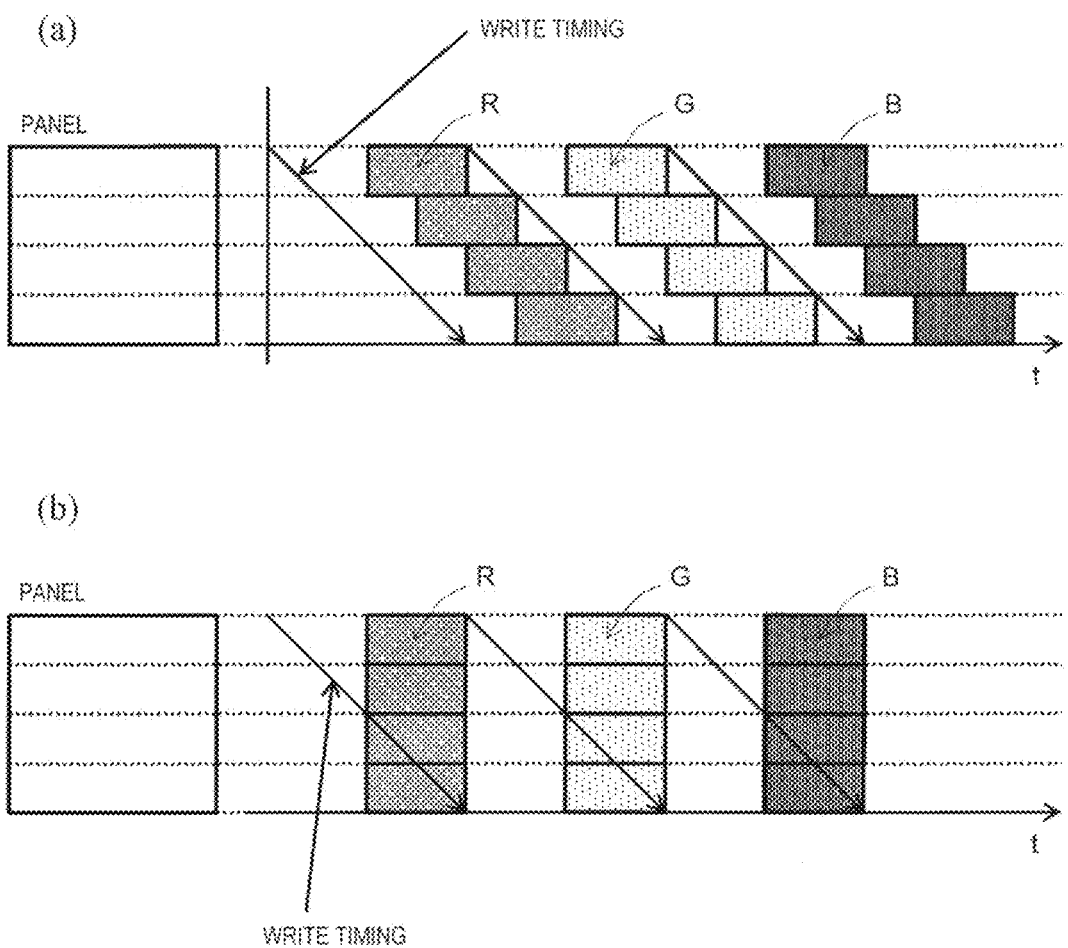
FIG. 10 (*a*) shows a relationship between color ray activation timing and signal write timing in the case where area driving is performed and see-through displaying is not performed; and (b) shows a relationship between color ray activation timing and signal write timing in the case where see-through displaying is performed and area driving is not performed.

First, before describing the specific construction of the liquid crystal display device 100, the causes for unevenness in luminance and intermixing of colors will be described. FIG. 10(a) is a diagram showing a relationship between, in the case where field sequential driving is performed, the driving timing (write timing) for the pixel and the activation timing of color rays (red light R, green light G, blue light B), with respect to different places in the liquid crystal display panel. FIG. 10(a) illustrates a case where area driving is performed by using a direct type backlight in which a plurality of light-emitting devices (LED devices) are disposed in a planar arrangement. When a plurality of light-emitting devices are disposed across the entire rear face of the liquid crystal display panel, the illuminator cannot present a light transmitting state, and thus see-through displaying cannot be achieved.

On the other hand, in a liquid crystal display device of a construction in which light-emitting devices are arrayed on the rear face of the liquid crystal display panel, as shown in FIG. 10(a), a so-called area driving can be adopted, where the emission timing of the light-emitting devices is varied from place to place. In this case, a color ray can be emitted based on various timings of driving the pixel that differ from place to place in the liquid crystal display panel. In this manner, even in the case of field sequential driving with a high frequency, a color ray can be emitted while allowing the liquid crystal molecules to sufficiently respond in each pixel, wherever in the panel. As a result, unevenness in luminance can be adequately suppressed.

On the other hand, as shown in FIG. 10(b), when see-through displaying is to be performed, a light-emitting device cannot be disposed on the rear face of the liquid crystal display panel, thus making it difficult to perform area driving. In a construction which enables see-through displaying, a light-transmissive light guide plate may be provided on the rear face, or light from a light source which is provided in a separate place may be led to the liquid crystal display panel. In such implementations, it is not easy to perform area driving such that the emission timing of the color ray from the illumination element is differed depending on the place in the liquid crystal display panel.

For this reason, as shown in FIG. 10(b), while sufficient response time may be achieved in pixels at the panel upper end, the response time in pixels at the panel lower end will not be sufficient, such that color ray irradiation will occur without arriving at the desired alignment; as a result, unevenness in luminance is likely to occur. In the case of low-frequency driving, it might be possible for the color ray emission to occur after waiting for the pixels at the panel lower end to respond. In the field sequential method, however, a driving frequency of e.g. 180 Hz or more is required. In this case, the write time incurred for all pixels is long relative to the driving frequency, which makes it difficult to adopt a manner of displaying such that color rays are emitted after a sufficient time has elapsed since completion of the writes to all pixels.

Figure 11:
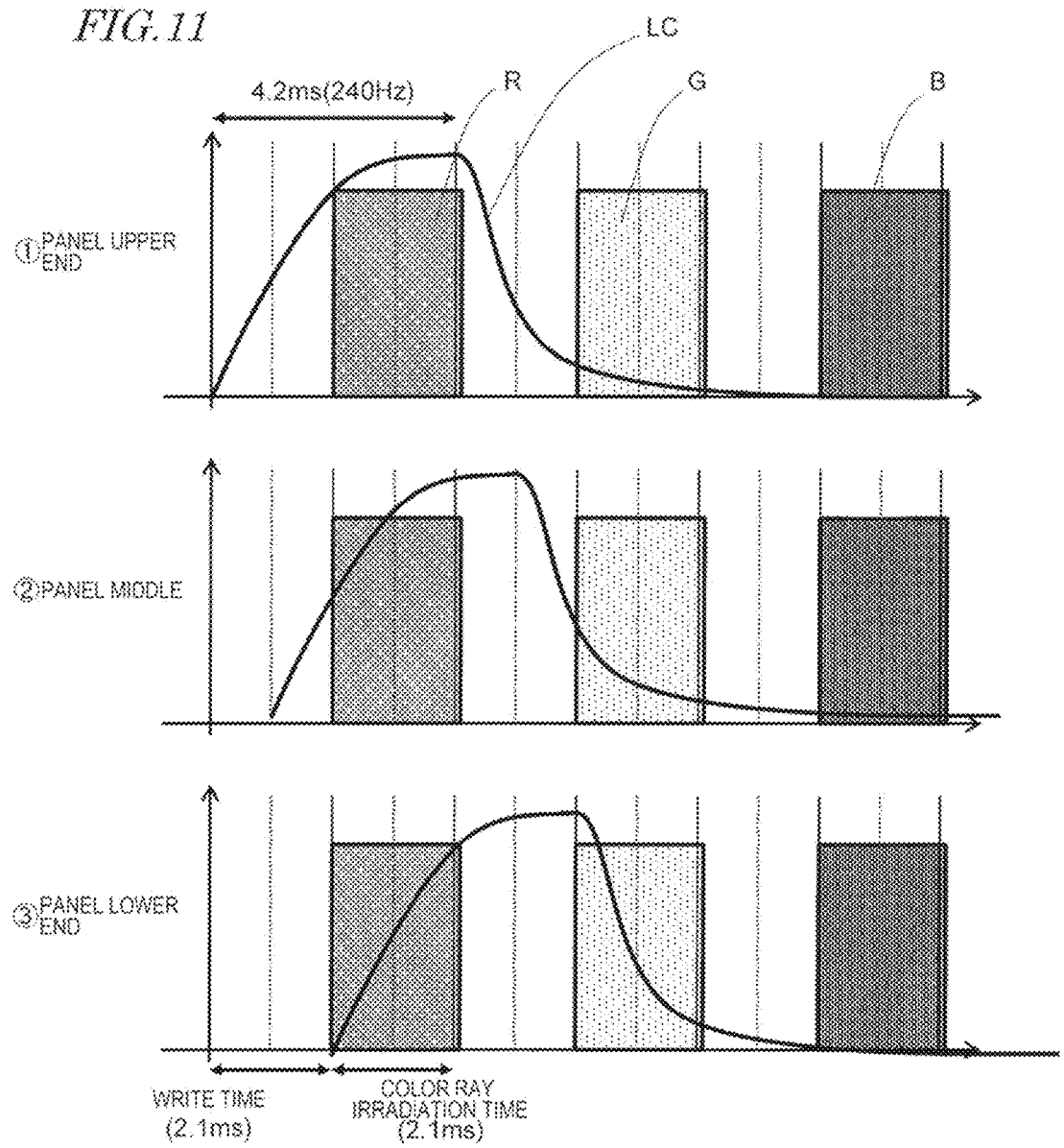
FIG. 11 A diagram showing relationships between signal write timing and color ray activation timing in a conventional example, divided in three sections respectively showing relationships at different places.

Thus, when the response speed of the liquid crystal is insufficient relative to the driving frequency, regions which allow desired displaying and regions which do not allow desired displaying will emerge, depending on the position in the plane of the liquid crystal display panel. For example, as shown in FIG. 11, when a single color of red is to be displayed, the transmittance of the liquid crystal layer can be made high in pixels at the panel upper end, at the timing of red light emission; in pixels in the panel middle where signal writes occur later than in the panel upper end, however, the transmittance of the liquid crystal layer will not have adequately decreased even at the timing of green light emission occurring in addition to red light emission, thus resulting in some intermixing of colors. At the panel lower end, the proportion of the emitted green light will further increase, so that mixed colors will be displayed that are far from the desired single color of red.

A more specific example will now be given. For instance, in the case where color ray irradiation is performed with a duty ratio of 50% (i.e., color ray activation periods and non-activation periods are repeated with a ratio of 1:1) under 240 Hz driving (a cycle of 4.2 ms=one field period), assuming a conventional method where a signal is to be written to every pixel before the color ray irradiation, writes from the panel upper end to the lower end are to be performed during the former 2.1 ms period of the field period, and color ray irradiation is to be performed in the 2.1 ms period following immediately after this. In this context, at the panel lower end, color ray irradiation will be made immediately after the signal writes, so that displaying will take place in a state where the liquid crystal has not sufficiently responded. On the other hand, at the panel upper end, 2.1 ms has already elapsed since the signal write, so that the liquid crystal has managed to sufficiently respond. As a result, a difference in the response state of the liquid crystal occurs between the panel upper end and the lower end, thus causing a luminance difference. Although the duty ratio of color ray irradiation might be reduced so that color ray irradiation would occur for a shorter period, the overall luminance would decrease in this case, thus hindering bright displaying.

Hereinafter, a liquid crystal display device according to the present embodiment which is arranged so as to suppress decreases in display quality in the above-described field sequential driving will be described.

FIG. 12 is a plan view showing a pixel arrangement in the liquid crystal display panel 1 of the present embodiment. As shown in FIG. 12, in the liquid crystal display panel 1, a plurality of pixels Px are arranged in a matrix shape of rows and columns. The plurality of pixels Px include a plurality of pixel rows Pr. At the same time, the plurality of pixels Px include a plurality of pixel columns Pc.

In each of the plurality of pixels Px, a TFT 16 is provided as a switching element, such that a scanning line 17 (gate bus line) extending along the horizontal direction and signal lines 18A and 18B (source bus lines) extending along the vertical direction are connected to each TFT 16. In order to avoid complexity of illustration, FIG. 12 only shows portions of the scanning lines 17 that lie outside the pixel region; in actuality, as will be appreciated, they are provided in a manner of extending within the pixel region along the horizontal direction, so as to be able to apply a gate voltage to the TFT of each pixel Px.

Among the scanning lines 17, scanning lines 17o in the odd-numbered rows constitute a first scanning line group, and are sequentially scanned from the panel upper end toward the panel lower end. Moreover, scanning lines 17e in the even-numbered rows constitute a second scanning line group, and are sequentially scanned from the panel lower end toward the panel upper end. As will be described later, the scanning lines 17o in the odd-numbered rows (first scanning line group) and the scanning lines 17e in the even-numbered rows (second scanning line group) may be connected to separate drivers, so as to each independently receive a gate signal supplied thereto.

In the implementation shown in FIG. 12, for each pixel column Pc that is constructed by a plurality of pixels Px flanking along the vertical direction, two signal lines 18A and 18B are provided on both sides of the pixel column Pc. As such, the structure in which two signal lines for applying signal voltages to one pixel column Pc may be referred to as a double-source structure. Moreover, adjacent pixels along the vertical direction in each pixel column Pc are connected to respectively different signal lines 18A and 18B. Stated otherwise, in one pixel column Pc, pixels Px connected to one signal line 18A and pixels Px connected to the other signal line 18A are alternatingly provided. In this construction, any pixel Px connected to one signal line 18A is driven by a scanning line (scanning line 17o in an odd-numbered row) included in first scanning line group, whereas any pixel Px connected to the other signal line 18B is driven by a scanning line (scanning line 17o in an even-numbered row) included in the second scanning line group.

Assuming now that the construction shown in FIG. 12 includes an upper electrode 11 and a lower electrode 12 being provided for one pixel as in the liquid crystal display device 100 (see FIG. 1 and FIG. 3), then the aforementioned two signal lines 18A and 18B mean two paired signal lines being provided in order to supply signal voltages to either the upper electrode 11 or the lower electrode 12. In other words, if one signal line 18A is connected to the upper electrode 11 of a given pixel Px via the first TFT 16A, then the other signal line 18B is connected to the upper electrode 11 of a next pixel Px that is adjacent along the column direction in the same pixel column Pc, via the first TFT 16A.

In this case, TFTs and signal lines (not shown) meant for the lower electrodes 12 of the respective pixels Px may be separately provided. In the present embodiment, when regarding signal lines for supplying signals to the upper electrodes 11 and signal lines for supplying signals to the lower electrodes 12 as composing one set of signal lines for pixels, then there are two (2 sets of) signal lines for pixels being provided for one pixel column Pc.

It will be appreciated that, in a liquid crystal display device in which only one pixel electrode for generating a vertical field or a lateral field is provided for the pixel, unlike in the liquid crystal display device 100, only two signal lines 18A and 18B may be provided that are connected to alternating pixels along the pixel column, as shown in FIG. 12.

In this construction, pixel voltages of mutually different polarities are applied to the aforementioned two signal lines 18A and 18B which are provided for one pixel column. In other words, in the pixel column Pc, the signal voltages which are applied to two pixels that are adjacent along the column direction have mutually different polarities. In this manner, with the signal polarities being made different between adjacent signal lines as shown in FIG. 12, frame inversion driving (i.e., a manner of driving which switches polarity per frame period) may merely be performed, whereby the display panel as a whole can perform dot inversion driving. Dot inversion driving is a driving method in which, during one frame period, signals of the same polarity are applied to pixels flanking along an oblique direction, i.e., signals of different polarities are applied to two adjacent pixels along the row direction or the column direction. In the above construction, every other pixels are connected to the same signal line; therefore, by applying signals of the same polarities to signal lines during one frame period, every other pixels will receive pixel voltages of the same polarity. By ensuring that these alternate between adjacent pixel columns, dot inversion driving can be easily realized.

Moreover, by providing two (two sets of) signal lines 18A and 18B in one pixel column Pc of a double-source construction as in the above-described present embodiment, and upon simultaneously turning ON the two scanning lines 17, signal writes to the pixels Px can be performed in a manner of two pixels per pixel column Pc. This allows the write time to be reduced to a half at the maximum.

Hereinafter, a specific write operation according to Embodiment 1 of the present invention will be described with reference also to a conventional example.

FIG. 13(a) illustrates a conventional write method described in Patent Document 3, and FIG. 13(b) is a diagram illustrating the write method according to Embodiment 1 of the present invention.

As shown in FIG. 13(a), in the method described in Patent Document 3, first, while skipping the even-numbered rows, only the scanning lines of the odd-numbered rows are selectively scanned sequentially from top to bottom to sequentially perform writes to the odd-numbered pixel rows (first period D1). Writes are made to the odd-numbered pixel rows until reaching the lower end of the panel, and then, conversely, the remaining scanning lines of the even-numbered rows are scanned from bottom to top to sequentially perform writes to the even-numbered pixel rows (second period D2). As a result, with respect to the color ray emission timing under the field sequential method, the timing of pixel writes can be averaged out over the entire panel.

However, in the method of Patent Document 3, only one signal line is provided for one pixel column. Therefore, the write timing may be averaged out, but the amount of time required for all writes is not reduced. Moreover, between pixels to which writes are made first and pixels to which writes are made last, a deviation in write timing occurs, as would in a method which involves writing in one direction to each single row.

Figure 14:
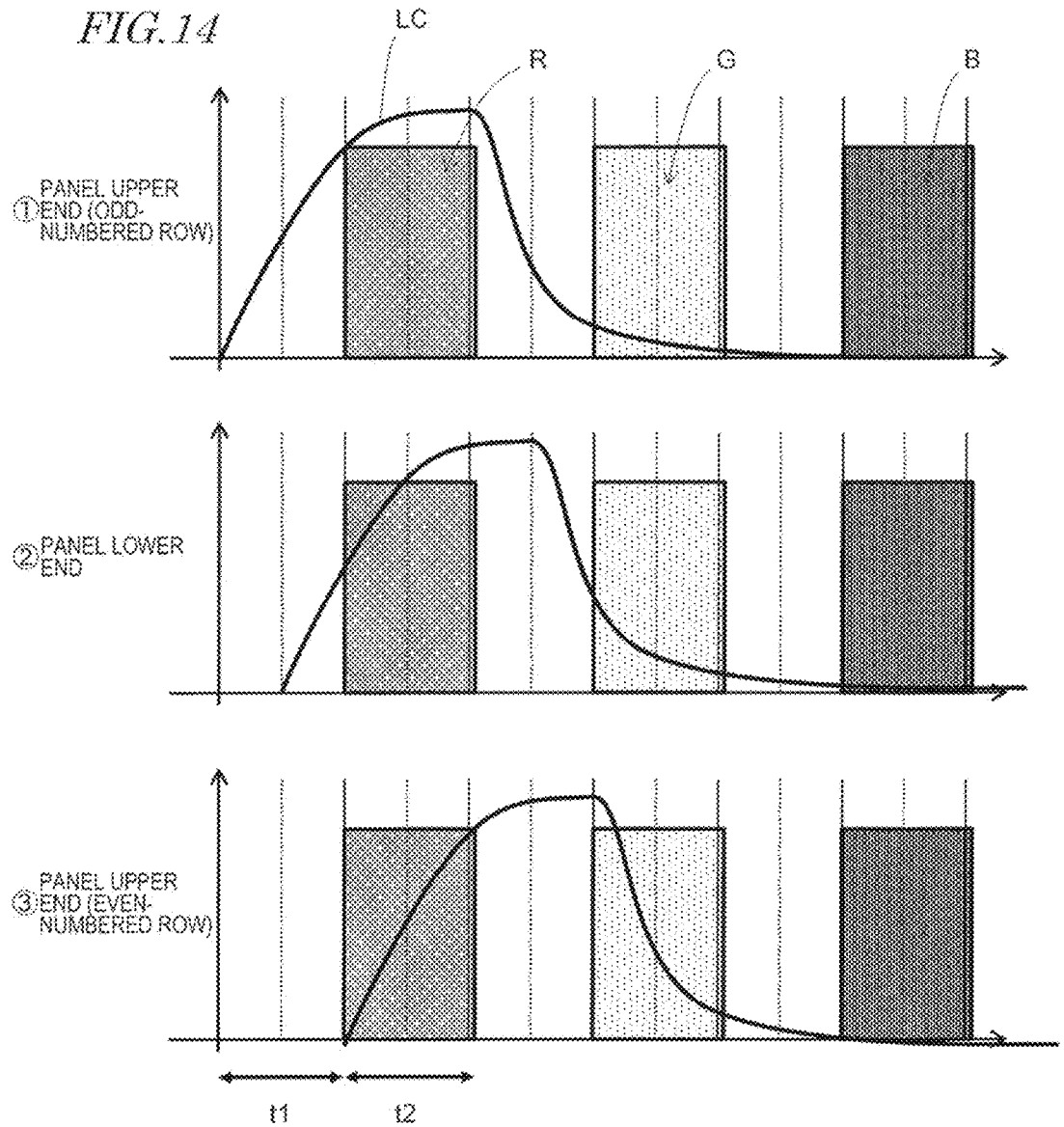
FIG. 14 A diagram showing relationships between signal write timing and color ray activation timing according to the conventional example illustrated in FIG. 13(*a*), divided in three sections respectively showing relationships at different places within the panel plane.

FIG. 14 shows, regarding the write method illustrated in FIG. 13(a), a relationship between changes in transmittance and color ray activation timing at the panel upper end (odd-numbered row), this relationship at the panel lower end, and this relationship at the panel upper end (even-numbered row). FIG. 14 illustrates an operation of displaying a single color of red, where the emission timings of red light R, green light G, and blue light B, and a graph LC representing the response (transmittance) of liquid crystal are shown in overlay.

In the present specification, a period for performing displaying with one color ray may be referred to as a one field period. FIG. 14 shows a total of three field periods in which to perform displaying by radiating red light R, green light G, and blue light B, respectively. In one field period, signal writes are made to all pixels; in the example shown in the figure, signal writes to the pixels are performed in the earlier half period t1 in each field period. Moreover, color rays are emitted in the later half period t2 in each field period.

As can be seen from FIG. 14, in the method described in Patent Document 3, in the region above the vicinity of the panel middle, there are greater luminance differences from pixel row to pixel row. Especially at the panel upper end, as will be seen from a comparison between the diagram shown in the uppermost section and the diagram shown in the lowermost section of FIG. 14, the response state LC may greatly differ, at a given point in time, between the odd-numbered pixel row to which writes are made first and the even-numbered pixel row to which writes are made last. As a result, even for the same applied signal, displaying differences may occur between adjacent rows, which may be observed as display unevenness. Moreover, regarding the entire panel, at the panel upper end where the last write is made, the luminance may possibly be lower than at the panel lower end, because pixel rows with greatly lowered luminance are included. This may result in unintended gradation.

Moreover, as will be seen from FIG. 13(a), in the method described in Patent Document 3, writes to the odd-numbered rows and writes to the even-numbered rows occur at different timings in the panel middle portion. In the liquid crystal display panel, display unevenness at the panel upper end and the panel lower end will not be noticeable, but display unevenness in the panel middle portion will be noticeable. Therefore, in the method described in Patent Document 3, when there is not sufficient liquid crystal response, display unevenness may possibly be noticeable in the panel middle portion.

On the other hand, as shown in FIG. 13(b), the method according to the present embodiment (Embodiment 1), which adopts the double-source structure, performs an operation of writing from the panel upper end toward the panel lower end (first period D1), and an operation of writing from the panel lower end toward the panel upper end (second period D2), in such a manner that there is a temporal overlap therebetween. More specifically, in Embodiment 1, writes from the top and writes from the bottom are begun with the same timing, and, by essentially simultaneously writing to odd-numbered pixel rows from the top and writing to even-numbered pixel rows from the bottom, the amount of time required for the writes is reduced to approximately a half.

As used herein, the notion of essentially simultaneously writing encompasses not only the case where writes are begun with perfectly the same timing, but also the case where there is a deviation within 5% (and preferably within 3%) of the overall write time between the timing of beginning writes from the top and the timing of beginning writes from the bottom.

Although Embodiment 1 illustrates an implementation where writes are made from both sides at essentially the same timing, the respective writes may be begun with different timings so long as there is some overlap between the write period D1 from the top (first period D1) and the write period D2 from the bottom (second period D2). However, the overlap period (i.e., a period in which two scanning lines are simultaneously being scanned, and writes are simultaneously being made to two pixel rows) is set to e.g. 30% or more of the period that is required for writes to all pixels, and is preferably 50% or more. In the implementation shown in FIG. 13(b), the first period D1 and the second period D2 are essentially the same period (100% overlap).

Moreover, the number of rows to which writes are made from the top and the number of rows to which writes are made from the bottom may be different. In the case where write directions are differentiated between the even-numbered rows and the odd-numbered rows as described above, there is no difference (or, if any, one row) between the numbers of rows to which writes are made; however, the numbers of rows to which writes are made may differ by a ratio in the range from e.g. 1:2 to 2:1. Furthermore, although the above illustrates that write directions are differentiated between the odd-numbered rows and the even-numbered rows from row to row, the rows to which writes are made from the top and the rows to which writes are made from the bottom may be differentiated for every two rows, or every three rows or more. For example, in the case of every two rows, assuming that 1 to 4n scanning lines (pixel rows) are provided, writes from the top may be made in a manner of 1, 2, 5, 6, . . . , 4n−3, and 4n−2, and writes from the bottom may be made in a manner of 4n, 4n−1, 4n−4, 4n−5, . . . , 4, and 3. However, from the standpoint of eliminating display unevenness, the numbers of rows to which writes are collectively made from the top and from the bottom are preferably five rows or less.

Figure 15:
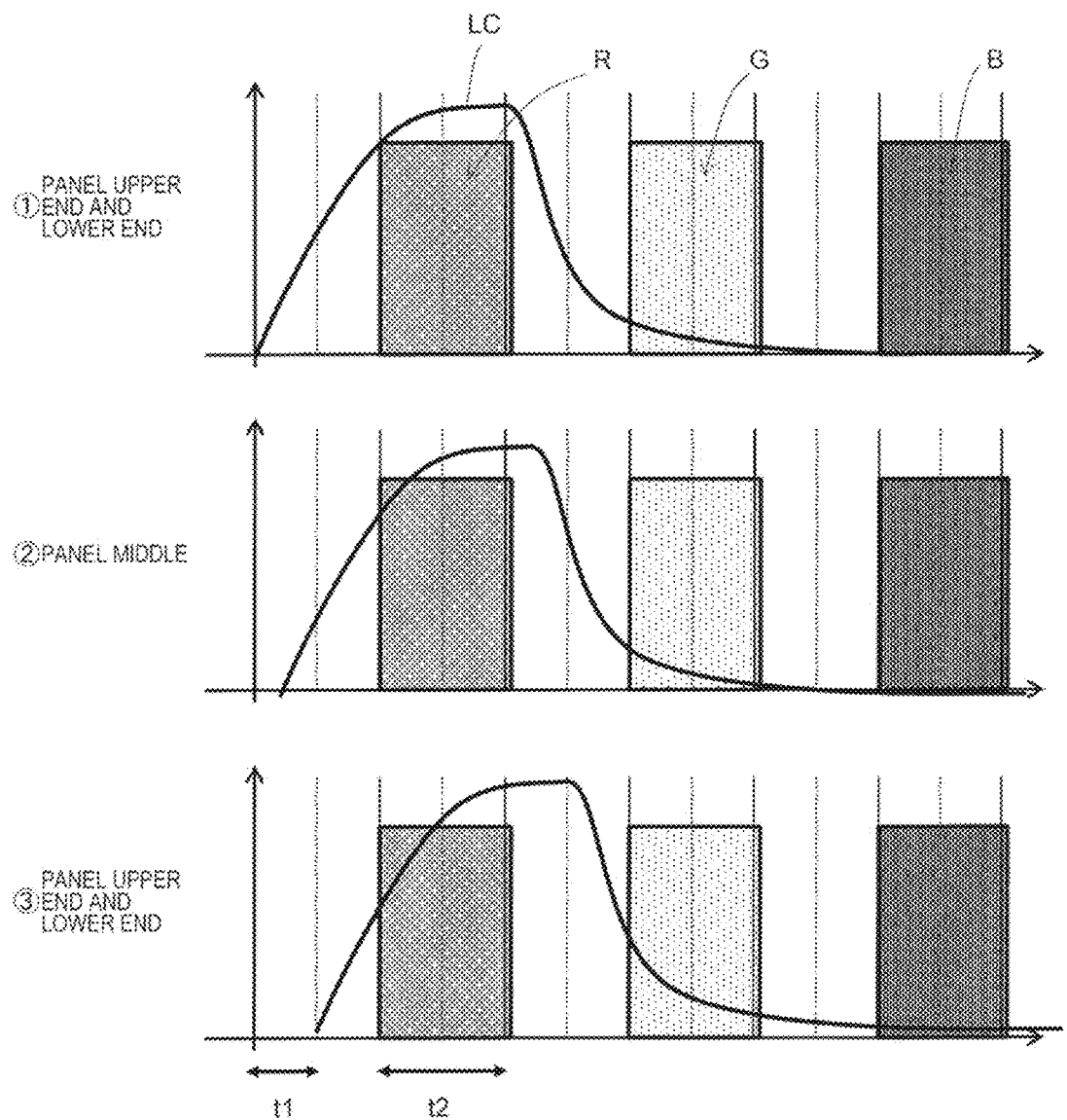
FIG. 15 A diagram showing a relationship between signal write timing and color ray activation timing according to Embodiment 1 of the present invention illustrated in FIG. 13(*b*), divided in three sections respectively showing relationships at different places within the panel plane.

FIG. 15 shows, regarding the write method illustrated in FIG. 13(b), a relationship between changes in transmittance and color ray activation timing at the panel upper end (odd-numbered row) and the lower end (even-numbered row), this relationship at the panel middle, and this relationship at the panel upper end (even-numbered row) and the lower end (odd-numbered row).

In the method of Embodiment 1, a deviation in write timing occurs between the panel upper end and the panel lower end for both of the odd-numbered pixel rows and the even-numbered pixel rows, but the size of such deviation is as small as about a half of the deviation at the panel upper end that is shown in FIG. 14. Moreover, at the panel middle portion where display unevenness would be noticeable, the writes to the odd-numbered rows and the writes to the even-numbered rows occurs with substantially similar timings. Therefore, display unevenness of the entire panel can be made less noticeable.

As described above, by adopting a double-source structure and through driving with a temporal overlap between write periods that are separately allocated for two scanning line groups, the write time can be reduced. For example, by performing the writes separately for the odd-numbered rows and the even-numbered rows from the top and the bottom in a manner of two rows at the same time, the write time can be reduced to a half. This reduces a time difference between writes to the odd-numbered rows and writes to the even-numbered rows, thus making the luminance difference less noticeable. In the pixel row to which writes are made last, where sufficient time is not guaranteed before color ray irradiation, response of the liquid crystal molecules is not sufficient; however, the pixel row that is adjacent to that row has sufficient response time guaranteed, and thus response of its liquid crystal molecules will be sufficient. As a result, large fluctuations in luminance are restrained from occurring depending on the place in the panel plane, whereby display unevenness is reduced. Note that the present embodiment also provides an advantage in that luminance changes are less noticeable, because the panel middle is the brightest and both sides of the panel are darker.

Figure 16:
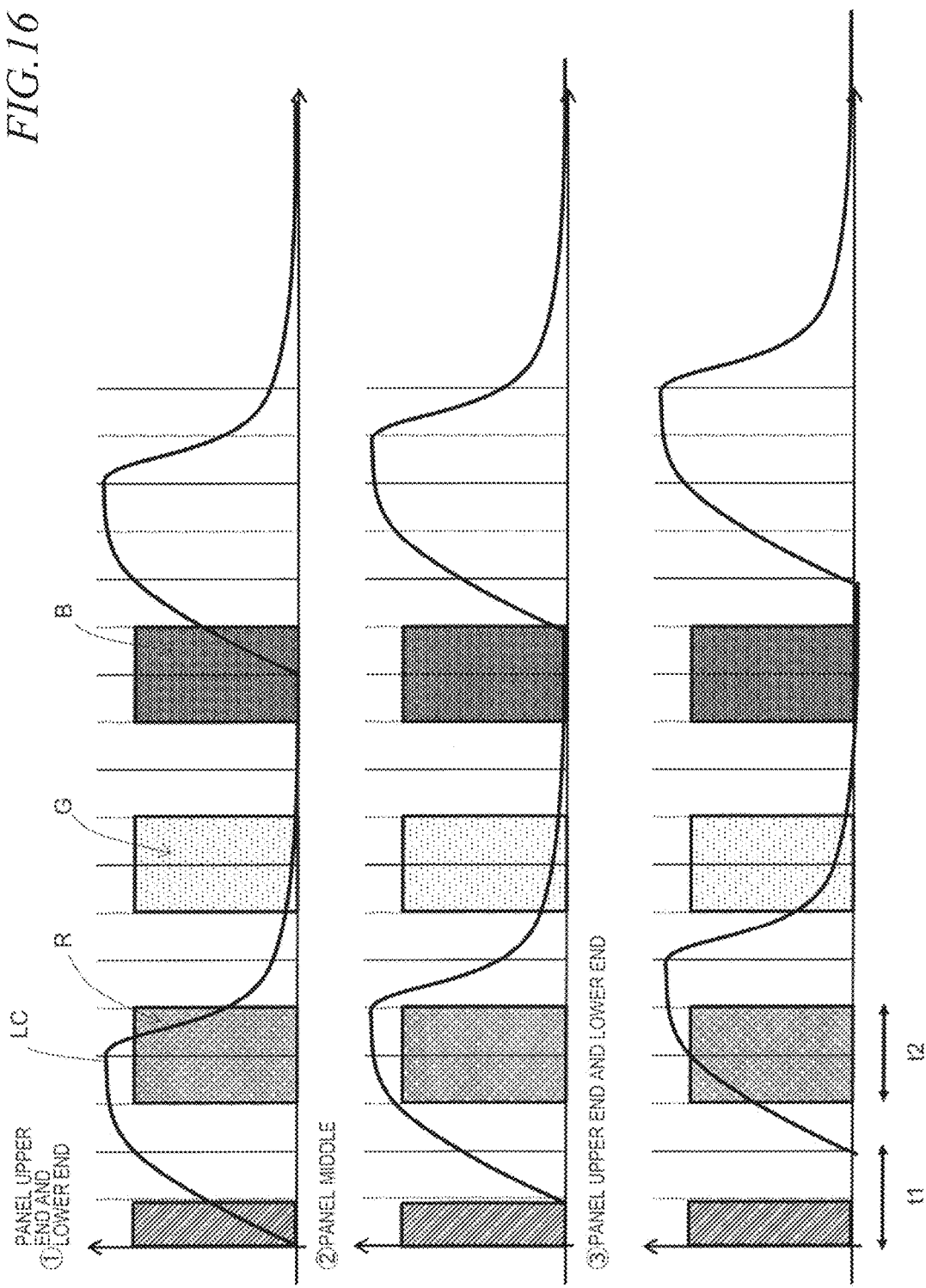
FIG. 16 A diagram showing a relationship between signal write timing and color ray activation timing according to Embodiment 2 of the present invention, divided in three sections respectively showing relationships at different places within the panel plane.

FIG. 16 is a diagram showing a relationship between the response state of liquid crystal and color ray activation timing according to Embodiment 2 of the present invention. It shows a relationship between changes in transmittance and color ray activation timing in the pixel rows at the panel upper end (odd-numbered row) and the lower end (even-numbered row) to which writes are made first, this relationship at the panel middle region, and this relationship in the pixel rows at the panel upper end (odd-numbered row) and the lower end (even-numbered row) to which writes are made last.

The method of the present Embodiment 2 differs from the method of Embodiment 1 shown in FIG. 15 in that the timing of color ray irradiation is matched to the timing of writes to the pixel rows in panel middle, so that irradiation occurs about ¼ cycles later than in Embodiment 1. Stated otherwise, in Embodiment 2, based on the driving of the pixel rows in the panel middle region as a reference, the emission periods of color rays are set so that the displaying characteristics of the pixel rows in the panel middle region are higher than the displaying characteristics in the pixel rows at the panel upper end and the panel lower end. As used herein, displaying characteristics refer to an index indicating whether color ray irradiation is being performed in a state where a desired liquid crystal response state has been achieved. For example, when a single color is to be displayed, in a pixel with high displaying characteristics, the pixel transmittance becomes maximum only in the period in which that color ray is emitted, whereas the pixel transmittance becomes minimum during any period in which another color ray is emitted. In a pixel with low displaying characteristics, the transmittance may not be maximum in a period in which another color ray is emitted, or the transmittance may not be minimum even in a period in which another color ray is emitted.

To explain this more specifically, when the aforementioned driving at 240 kHz is to be performed, the illumination element may be controlled so that the timing of color ray irradiation dictates that, for example, color rays are radiated in a period of e.g. 3.15 ms to 5.25 ms from the first write (or the beginning of one frame period) being defined as 0 second, whereby displaying can be performed with a timing that is most advantageous for the panel middle.

As a result, the highest display quality can be achieved in the panel middle by adapting to the best timing for the panel middle region, thereby achieving an optimum displaying that makes the most of the panel performance in the most attention-catching panel middle. In the present embodiment, in the pixel rows at the panel upper end and the panel lower end to which writes are made first (i.e., the uppermost section in FIG. 16), the displaying may suffer from mixing of a blue color under the influence of the blue light which was previously emitted; however, this is immediately after the writes and the liquid crystal has not responded much yet, and there is no significant influence. In the pixel rows at the panel lower end and the panel upper end to which writes are made last (i.e., the lowermost section in FIG. 16), a green color may become mixed under the influence of the green light which was subsequently emitted, but only to a similar degree to the pixel rows to which writes are made first in Embodiment 1 as illustrated in FIG. 15 (i.e., the uppermost section in FIG. 15), and thus the influence is small.

In Embodiment 1 illustrated in FIG. 15 as well as Embodiment 2 illustrated in FIG. 16, within the field period, the period t2 of color ray emission falls after the lapse of the first period D1 and after the lapse of the second period D2 (i.e., after the write period t1 for every pixel), with a predetermined period (e.g., ¼ field periods) therefrom. This is because the fact that the overall write period has been reduced permits an operation such that color rays are radiated only after at least a certain degree of liquid crystal response has been obtained.

Figure 17:
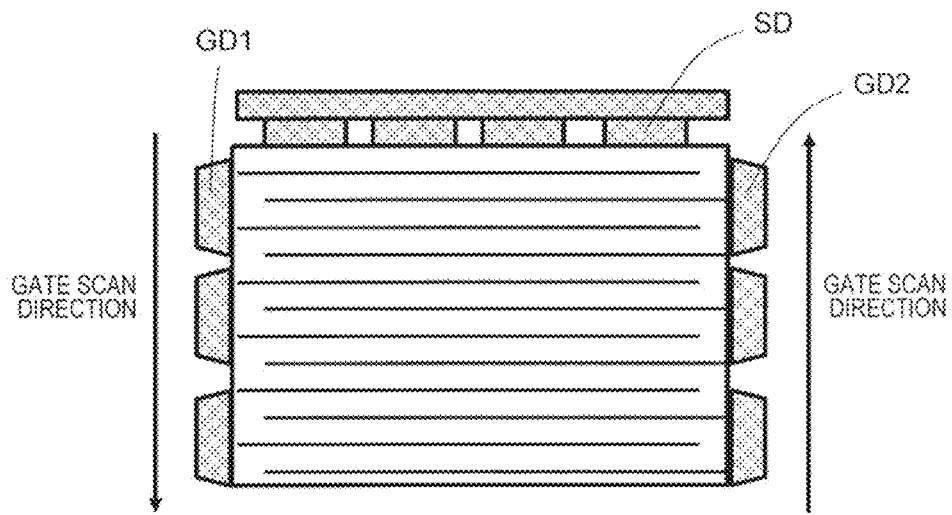
FIG. 17 A diagram showing an exemplary construction where scanning lines divided into two groups which can each be independently driven.

FIG. 17 shows an exemplary construction for a liquid crystal display panel in a liquid crystal display device according to Embodiment 3, where the scanning lines simultaneous scanned from the panel top and from the panel bottom.

In order to most simply realize a bi-directional scan of scanning lines by using a known gate driver, as shown in FIG. 17, independently controllable gate drivers GD1 and GD2 may be disposed on both sides (right and left sides) so as to sandwich the panel. One gate driver GD1 is connected to scanning lines of the odd-numbered rows, whereas the other gate driver GD2 is connected to scanning lines of the even-numbered rows. In operation, while supplying gate signals to the respective gate drivers GD1 and GD2, one gate driver GD1 may be used to sequentially scan the scanning lines of the odd-numbered rows from the upper end toward the lower end of the panel, and the opposite gate driver GD2 may be used to sequentially scan the scanning lines of the even-numbered rows from the lower end toward the upper end of the panel. In the implementation shown in FIG. 17, a source driver SD that is connected to the signal lines is disposed on the upper side of the panel. The source driver SD may have any known construction that is adaptable to a double-source construction.

As has been described above, in the liquid crystal display devices of Embodiments 1 to 3, a pair of signal lines that are connected to one pixel column are provided, and field sequential driving is performed. In this operation, one field period includes a first period D1 in which a first scanning line group (e.g., scanning lines of the odd-numbered rows) are scanned and signal writes are made by using one of the pair of signal lines and a second period D2 in which a second scanning line group (e.g., scanning lines of the even-numbered rows) are scanned and signal writes are made by using the other one of the pair of signal lines, such that there is a temporal overlap between these periods. This allows the write time for all pixels to be reduced, thus decreasing the possibility that the display quality may be lowered due to insufficient response time of the liquid crystal. This can suppress decreases in display quality, such as unevenness in luminance during field sequential driving. Moreover, by ensuring that the direction of sequentially scan is opposite between the first period D1 and the second period D2, unevenness in luminance in the panel plane can be suppressed even more effectively, thereby providing more improvements in the quality of displaying in the panel middle region than in elsewhere.

In the above-described embodiments, liquid crystal molecules 31 in the liquid crystal layer 30 take a twist alignment in the transparent displaying state. This allows a more vivid (clearer) transparent displaying to be realized. Under a twist alignment, the liquid crystal molecules 31 are oriented in an identical direction within a plane which is parallel to the display surface; therefore, any diffraction associated with refractive index differences within the plane, or any diffraction associated with dark lines ascribable to the liquid crystal mode (i.e., dark lines caused by structures for regulating the alignment direction, or points of discontinuous alignment directions that may occur within the plane) does not occur.

The example illustrated herein is a construction where liquid crystal molecules 31 near the center along the thickness direction of the liquid crystal layer 30 are aligned substantially orthogonal to the slit direction D (that is, an average orientation direction in the bulk liquid crystal is substantially orthogonal to the slit direction D) in the white displaying state and in the transparent displaying state. Alternatively, a construction where liquid crystal molecules 31 near the center along the thickness direction of the liquid crystal layer 30 are aligned substantially parallel to the slit direction D (that is, an average orientation direction in the bulk liquid crystal is substantially parallel to the slit direction D) in the white displaying state and in the transparent displaying state may be adopted. However, from the standpoint of brightness of display, the former construction (which hereinafter may also be referred to as the "orthogonal type") is more preferable than the latter construction (which hereinafter may also be referred to as the "parallel type").

Figure 18:
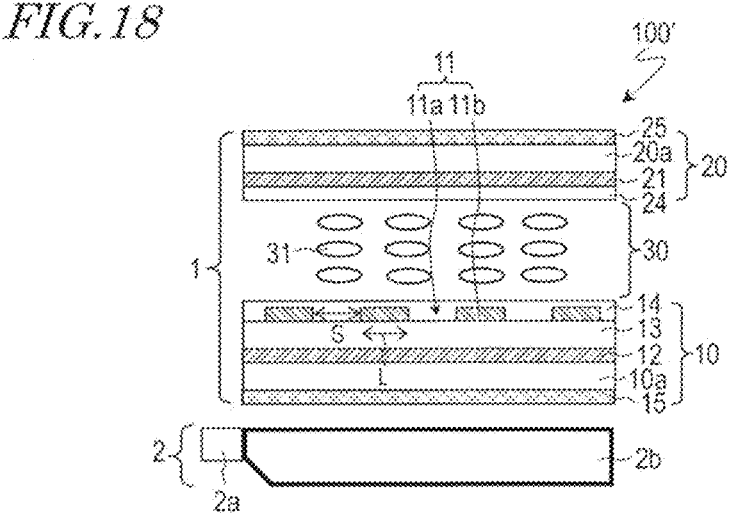
FIG. 18 A cross-sectional view schematically showing another liquid crystal display device 100' according to an embodiment of the present invention.
Figure 19:
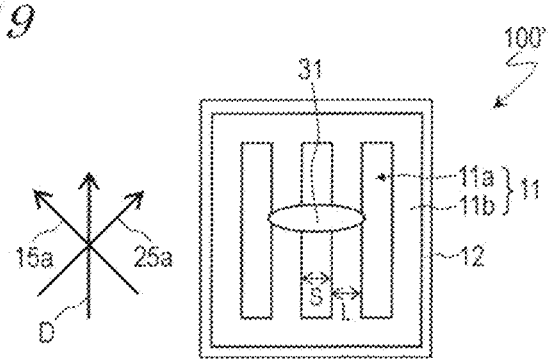
FIG. 19 A plan view schematically showing another liquid crystal display device 100' according to an embodiment of the present invention.

Moreover, as in a liquid crystal display device 100' shown in FIG. 18 and FIG. 19, a construction may be adopted where liquid crystal molecules 31 in the liquid crystal layer 30 take a homogeneous alignment in a transparent displaying state.

In the liquid crystal display device 100', the pretilt direction defined by each of the first horizontal alignment film 14 and the second horizontal alignment film 24 is set so that the liquid crystal molecules 31 will take a homogeneous alignment in a state where no voltage is applied to the liquid crystal layer 30 (i.e., a state where no electric field is generated). Specifically, the pretilt direction defined by each of the first horizontal alignment film 14 and the second horizontal alignment film 24 is substantially orthogonal to the direction that the slits 11a in the upper electrode 11 extend (slit direction) D. In other words, the pretilt direction defined by the first horizontal alignment film 14 and the pretilt direction defined by the second horizontal alignment film 24 are parallel or antiparallel to each other.

Moreover, the respective transmission axes 15a and 25a of the first polarizing plate 15 and the second polarizing plate 25 constitute an angle of about 45° with the pretilt direction that is defined by each of the first horizontal alignment film 14 and the second horizontal alignment film 24. Therefore, the respective transmission axes 15a and 25a of the first polarizing plate 15 and the second polarizing plate 25 constitute an angle of about 45° with the slit direction D.

Figure 20:
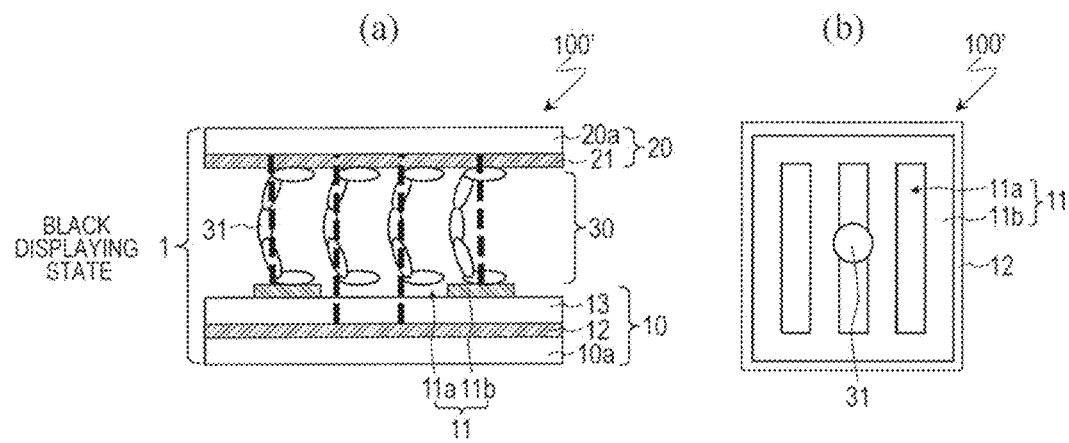
FIGS. 20 (*a*) and (*b*) are a cross-sectional view and a plan view showing an alignment of liquid crystal molecules 31 in a black displaying state of the liquid crystal display device 100'.

FIGS. 20(a) and (b) show an alignment of liquid crystal molecules 31 in a black displaying state. In the black displaying state, a predetermined voltage is applied between the counter electrode 21 and the upper electrode 11 and lower electrode 12 (e.g., potentials of 7 V, 7.5 V, and 0 V are respectively given to the upper electrode 11, the lower electrode 12, and the counter electrode 21), whereby a vertical field is generated across the liquid crystal layer 30. FIG. 20(a) schematically shows the electric lines of force in this state with broken lines.

In this black displaying state, as shown in FIGS. 20(a) and (b), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30).

Figure 21:
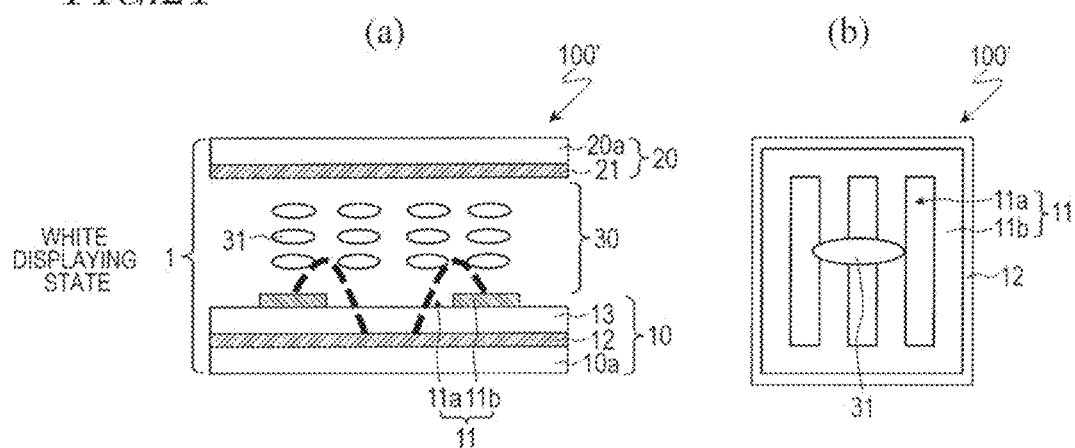
FIGS. 21 (*a*) and (*b*) are a cross-sectional view and a plan view showing an alignment of liquid crystal molecules 31 in a white displaying state of the liquid crystal display device 100'.

FIGS. 21(a) and (b) show an alignment of liquid crystal molecules 31 in a white displaying state. In the white displaying state, a predetermined voltage is applied between the upper electrode 11 and the lower electrode 12 (e.g., potentials of 0 V, 7.5 V, and 0 V are respectively given to the upper electrode 11, the lower electrode 12, and the counter electrode 21), thereby generating a lateral field (fringing field) across the liquid crystal layer 30. FIG. 21(a) schematically shows the electric lines of force in this state with broken lines.

In this white displaying state, as shown in FIGS. 21(a) and (b), the liquid crystal molecules 31 in the liquid crystal layer 30 are aligned substantially parallel to the substrate plane (i.e., substantially vertically to the layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute an angle of about 45° with the respective transmission axes 15a and 25a of the first polarizing plate 15 and the second polarizing plate 25.

Figure 22:
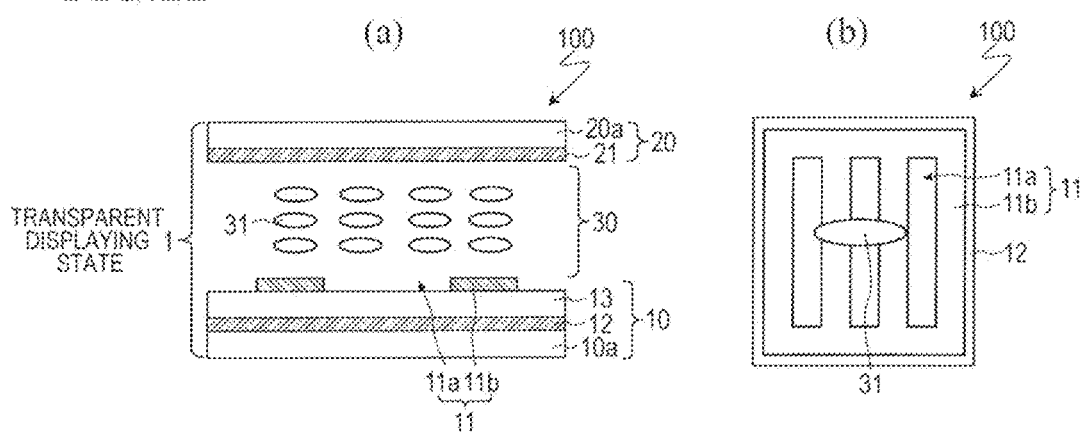
FIGS. 22 (*a*) and (*b*) are a cross-sectional view and a plan view showing an alignment of liquid crystal molecules 31 in a transparent displaying state of the liquid crystal display device 100'.

FIGS. 22(a) and (b) show an alignment of liquid crystal molecules 31 in a transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, as shown in FIGS. 22(a) and (b), the liquid crystal molecules 31 in the liquid crystal layer 30 take a homogeneous alignment. In other words, the liquid crystal molecules 31 are aligned substantially parallel to the substrate plane (i.e., substantially vertically to layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute an angle of about 45° with the respective transmission axes 15a and 25a of the first polarizing plate 15 and the second polarizing plate 25. The light transmittance of each pixel of the liquid crystal display device 100' is the highest in this transparent displaying state (i.e., higher than those in the black displaying state and the white displaying state).

In the liquid crystal display device 100', too, a vertical field is generated across the liquid crystal layer 30 in the black displaying state, and a lateral field is generated across the liquid crystal layer 30 in the white displaying state. Therefore, the torque due to voltage application acts on the liquid crystal molecules 31, at both a fall (a transition from the white displaying state to the black displaying state) and a rise (a transition from the black displaying state to the white displaying state). As a result, good response characteristics are attained. Moreover, each pixel is capable of exhibiting not only the black displaying state and the white displaying state, but also the transparent displaying state, i.e., a state where no voltage is applied across the liquid crystal layer 30; therefore, the problem of background blur (it being perceived as double images) can be prevented.

Although FIG. 1 illustrates a construction in which an edgelight-type backlight is disposed as the illumination element 2 on the rear face side of the liquid crystal display panel 1 so as to overlap the liquid crystal display panel 1, the illumination element 2 is not to be limited to this example.

For example, a construction shown in FIG. 23 may be adopted. In the construction shown in FIG. 23, the liquid crystal display panel 1 and the illumination element 2 of the liquid crystal display device 100 (or the liquid crystal display device 100') are attached on a transparent case 50 of a box shape. The case 50 having the liquid crystal display panel 1 and the illumination element 2 attached thereto is used as a showcase, for example.

The liquid crystal display panel 1 is attached to a side face 50s, among a plurality of side faces of the case 50. The illumination element 2 is attached to an upper face 50t of the case 50. In a manner described above, the illumination element 2 is capable of switchably irradiating the liquid crystal display panel 1 with a plurality of color rays including red light, green light, and blue light. From the standpoint of enhancing the efficiency of light utilization (i.e., allowing as much light from the illumination element 2 to enter the liquid crystal display panel 1 as possible), it is preferable that the inner surface of the case 50 has a light diffusing property.

INDUSTRIAL APPLICABILITY

According to an embodiment of the present invention, there is provided a liquid crystal display device driven by the field sequential method which excels in both response characteristics and display quality, the liquid crystal display device being suitable for use as a see-through display. A liquid crystal display device (see-through display) according to an embodiment of the present invention is used as a display device for an information display system or digital signage, for example.

REFERENCE SIGNS LIST 1 liquid crystal display panel
2 illumination element
2a light source unit
2b light guide plate
10 first substrate (rear substrate)
10a transparent substrate
11 first electrode (upper electrode)
11a slit
11b branch portion
12 second electrode (lower electrode)
12a slit
12b branch portion
13 insulating layer
14 first horizontal alignment film
15 first polarizing plate
15a transmission axis of first polarizing plate
16A first TFT
16B second TFT
17 gate bus line (scanning line)
18 source bus line (signal line)
20 second substrate (front substrate)
20a transparent substrate
21 third electrode (counter electrode)
24 second horizontal alignment film
25 second polarizing plate
25a transmission axis of second polarizing plate
30 liquid crystal layer
31 liquid crystal molecules
50 case
100, 100' liquid crystal display device

The invention claimed is:

1. A liquid crystal display device comprising a liquid crystal display panel having a plurality of pixels thereon and an illumination element capable of switchably irradiating the liquid crystal display panel with a plurality of color rays, the liquid crystal display device performing displaying by field sequential driving, wherein,
   in the liquid crystal display panel, the plurality of pixels are provided in a matrix shape of rows and columns, the plurality of pixels including a plurality of pixel rows and a plurality of pixel columns, the liquid crystal display panel including
   a plurality of scanning lines respectively connected to the plurality of pixel rows, and
   a plurality of signal lines each connected to one of the plurality of pixel columns, the plurality of signal lines including a plurality of pairs of signal lines, each pair of signal line being connected to one said pixel column,
   under the field sequential driving, within one field period of emitting any of the plurality of color rays, there is an overlap between: a first period in which a first scanning line group included among the plurality of scanning lines are scanned and one of the pair of signal lines is used to perform signal writes; and a second period in which a second scanning line group included among the plurality of scanning lines are scanned, the second scanning line group being different from the first scanning line group, and another one of the pair of signal lines is used to perform signal writes, and
   in a middle region along a column direction of the liquid crystal display panel, signals are written with essentially a same timing to pixel rows connected to scanning lines that are included in the first scanning line group and to pixel rows connected to scanning lines that are included in the second scanning line group.

2. The liquid crystal display device of claim 1, wherein, in the first period, the first scanning line group is scanned in a first direction, and in the second period, the second scanning line group is scanned in a second direction which is the opposite direction of the first direction.

3. The liquid crystal display device of claim 1, wherein a timing of beginning scanning in the first period in which the first scanning line group is scanned and a timing of beginning scanning in the second period in which the second scanning line group is scanned are essentially the same.

4. The liquid crystal display device of claim 1, wherein the first period and the second period are essentially a same period.

5. The liquid crystal display device of claim 1, wherein pixels connected to one of the pair of signal lines and pixels connected to the other of the pair of signal lines alternate along the pixel column.

6. The liquid crystal display device of claim 1, wherein, within the field period, emission of the color ray occurs after the lapse of the first period and after the lapse of the second period, with a predetermined period therefrom.

7. The liquid crystal display device of claim 1, wherein the first period is a period in which signal writes are selectively performed for pixel rows of either one of odd-numbered rows or even-numbered rows from an upper end toward a lower end of the liquid crystal display panel, and the second period is a period in which signal writes are selectively performed for pixel rows of the other one of odd-numbered rows and even-numbered rows from the lower end toward the upper end of the liquid crystal display panel.

8. The liquid crystal display device of claim 1, capable of presenting a transparent displaying state in which a rear face side of the liquid crystal display panel is visible in a see-through manner.

9. The liquid crystal display device of claim 1, wherein,
the liquid crystal display panel includes a liquid crystal display panel including a first substrate and a second substrate opposed to each other, and a liquid crystal layer interposed between the first substrate and the second substrate;
the first substrate includes first electrodes respectively provided for the plurality of pixels, and second electrodes disposed below the first electrodes via an insulating layer, the second electrodes generating a lateral field across the liquid crystal layer in cooperation with the first electrode;
the second substrate includes a third electrode opposed to the first electrodes and the second electrodes to generate a vertical field across the liquid crystal layer in cooperation with the first electrodes and the second electrodes; and
each of the plurality of pixels is capable of switchably presenting
a black displaying state of performing black displaying with a vertical field generated across the liquid crystal layer,
a white displaying state of performing white displaying with a lateral field generated across the liquid crystal layer, or
a transparent displaying state in which a rear face side of the liquid crystal display panel is visible in a see-through manner with no voltage being applied to the liquid crystal layer.

10. The liquid crystal display device of claim 9, wherein, in the transparent displaying state, liquid crystal molecules in the liquid crystal layer take a twist alignment.

11. A liquid crystal display device comprising a liquid crystal display panel having a plurality of pixels thereon and an illumination element capable of switchably irradiating the liquid crystal display panel with a plurality of color rays, the liquid crystal display device performing displaying by field sequential driving, wherein,
in the liquid crystal display panel, the plurality of pixels are provided in a matrix shape of rows and columns, the plurality of pixels including a plurality of pixel rows and a plurality of pixel columns, the liquid crystal display panel including
a plurality of scanning lines respectively connected to the plurality of pixel rows, and
a plurality of signal lines each connected to one of the plurality of pixel columns, the plurality of signal lines including a plurality of pairs of signal lines, each pair of signal line being connected to one said pixel column;
under the field sequential driving, within one field period of emitting any of the plurality of color rays, there is an overlap between, a first period in which a first scanning line group included among the plurality of scanning lines are scanned and one of the pair of signal lines is used to perform signal writes; and a second period in which a second scanning line group included among the plurality of scanning lines are scanned, the second scanning line group being different from the first scanning line group, and another one of the pair of signal lines is used to perform signal writes,
within the field period, emission of the color ray occurs after the lapse of the first period and after the lapse of the second period, with a predetermined period therefrom, and
wherein emission of the color ray is performed based on a timing of making signal writes to pixel rows in a middle region along a column direction of the liquid crystal display panel, thereby enhancing displaying characteristics of the pixel rows in the middle region along the column direction over displaying characteristics of pixel rows in any other region.

12. The liquid crystal display device of claim 11, wherein the first period is a period in which signal writes are selectively performed for pixel rows of either one of odd-numbered rows or even-numbered rows from an upper end toward a lower end of the liquid crystal display panel, and the second period is a period in which signal writes are selectively performed for pixel rows of the other one of odd-numbered rows and even-numbered rows from the lower end toward the upper end of the liquid crystal display panel.

13. The liquid crystal display device of claim 11, capable of presenting a transparent displaying state in which a rear face side of the liquid crystal display panel is visible in a see-through manner.

14. The liquid crystal display device of claim 11, wherein,
the liquid crystal display panel includes a liquid crystal display panel including a first substrate and a second substrate opposed to each other, and a liquid crystal layer interposed between the first substrate and the second substrate;
the first substrate includes first electrodes respectively provided for the plurality of pixels, and second electrodes disposed below the first electrodes via an insulating layer, the second electrodes generating a lateral field across the liquid crystal layer in cooperation with the first electrode;
the second substrate includes a third electrode opposed to the first electrodes and the second electrodes to generate a vertical field across the liquid crystal layer in cooperation with the first electrodes and the second electrodes; and
each of the plurality of pixels is capable of switchably presenting
a black displaying state of performing black displaying with a vertical field generated across the liquid crystal layer,
a white displaying state of performing white displaying with a lateral field generated across the liquid crystal layer, or
a transparent displaying state in which a rear face side of the liquid crystal display panel is visible in a see-through manner with no voltage being applied to the liquid crystal layer.

15. The liquid crystal display device of claim 14, wherein, in the transparent displaying state, liquid crystal molecules in the liquid crystal layer take a twist alignment.

* * * * *